United States Patent

Nakayama et al.

[11] Patent Number: 5,872,924
[45] Date of Patent: Feb. 16, 1999

[54] COLLABORATIVE WORK SUPPORT SYSTEM

[75] Inventors: Yoshiyuki Nakayama; Takeshi Ishizaki, both of Kawasaki; Toshimitsu Hayashi, Hadano; Yoshinobu Tanigawa, Osaka; Minoru Koizumi, Yohohama; Masami Kameda, Yokohama, all of Japan

[73] Assignee: Hitachi, Ltd., Tokyo, Japan

[21] Appl. No.: 638,129

[22] Filed: Apr. 26, 1996

[30] Foreign Application Priority Data

Apr. 28, 1995 [JP] Japan .................................. 7-106638

[51] Int. Cl.⁶ ..................................................... G06F 3/14
[52] U.S. Cl. .............................. 395/200.35; 395/200.57; 395/200.68; 345/331; 345/332
[58] Field of Search ............................... 395/200.35, 326, 395/339, 340, 331–332, 343, 344, 346, 200.31, 200.33, 200.57, 200.68, 500; 364/DIG. 1, 228, 222.2, 284.4, 243, 271; 345/118, 330, 331, 332, 326

[56] References Cited

U.S. PATENT DOCUMENTS

| | | | |
|---|---|---|---|
| 5,008,853 | 4/1991 | Bly et al. ................................ | 395/331 |
| 5,220,657 | 6/1993 | Bly et al. ........................... | 364/DIG. 1 |
| 5,280,583 | 1/1994 | Nakayama et al. ..................... | 395/332 |
| 5,353,398 | 10/1994 | Kitahara et al. ........................ | 395/332 |
| 5,392,400 | 2/1995 | Berkowitz et al. ..................... | 395/332 |
| 5,561,811 | 10/1996 | Bier ......................................... | 395/332 |
| 5,602,996 | 2/1997 | Powers, III et al. .................... | 395/344 |
| 5,617,539 | 4/1997 | Ludwig et al. ..................... | 395/200.02 |
| 5,652,866 | 7/1997 | Alded et al. ............................ | 395/500 |

OTHER PUBLICATIONS

Sarin et al, "Computer–Based Real–Time Conferencing Systems", Computer, vol. 18, No. 10, Oct. 1985.
Stefic et al, "Beyond the Chalkboard: Computer Support for Collaboration and Problem Solving in Meetings", Communications of the ACM, vol. 30, No. 1, Jan. 1987.
Watabe et al, "Distributed Multiparty Desktop Conferencing System: Mermaid", Proceedings of CSCW 90, Oct. 1990.

*Primary Examiner*—John Barlow
*Assistant Examiner*—Bryan Bui
*Attorney, Agent, or Firm*—Antonelli, Terry, Stout & Kraus, LLP

[57] ABSTRACT

A shared window of the same content is displayed on each display device of a plurality of computers connected through a communication network for use in a collaborative work and objects are displayed on the window. Each object is displayed based on object management data having a plurality of types of attributes set therein and the shared windows on which the objects are displayed are limited by the attribute values of the attributes. Further, participants of the collaborative work who are permitted to erase the objects are limited by the settings of the attribute values of the attributes.

23 Claims, 22 Drawing Sheets

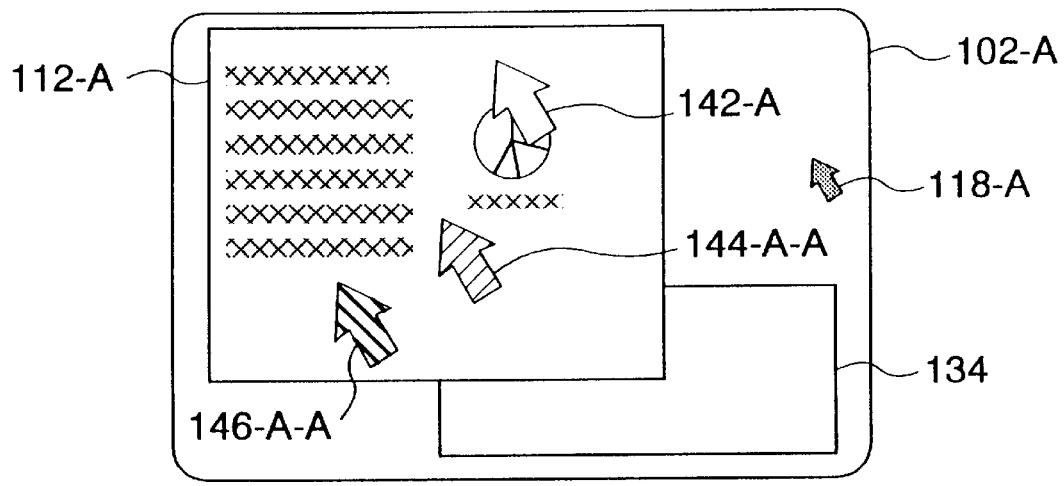
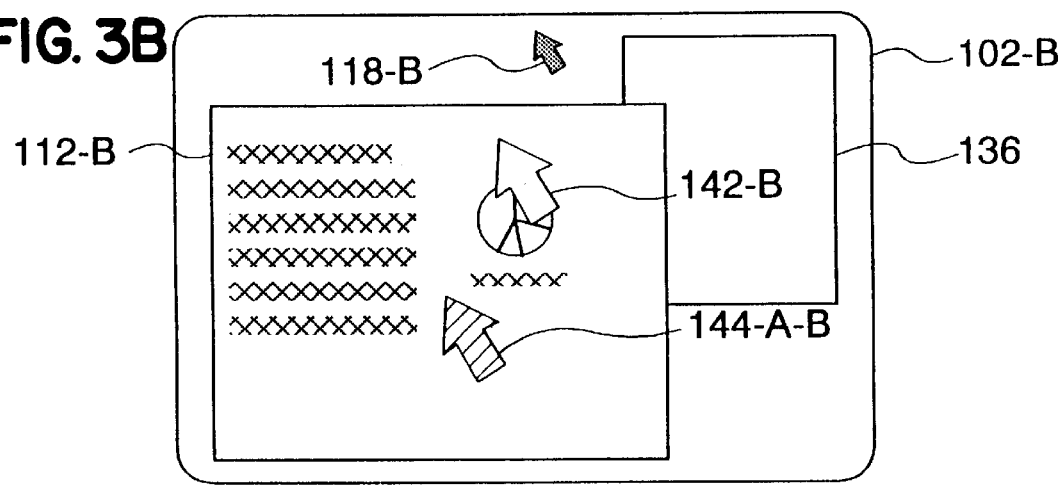
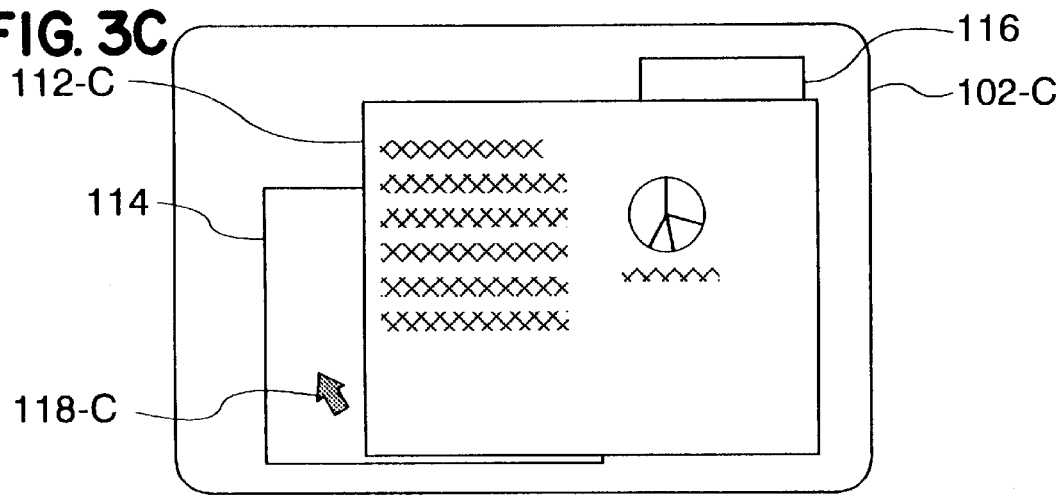

FIG. 8

| ATTRIBUTE NAME | ATTRIBUTE VALUE |
|---|---|
| AUTHOR | USER ID |
| DATE AND TIME OF PREPARATION | DATE AND TIME |
| OWNER | AUTHOR   USER ID   GROUP ID   "ALL PARTICIPANTS" |
| DATE AND TIME OF OWNERSHIP | DATE AND TIME OF PREPARATION   DATE AND TIME |
| CLOSED AREA SETTING | "ALL PARTICIPANTS"   GROUP ID   USER LIST |
| OPERATION MODE | "SHARE"   "PRIVATE" |
| OPEN MODE | "OPEN"   "NON-OPEN" |
| INDICATOR | "NON-DISPLAY"   "DISPLAY" |
| HANDLING AT SEPARATION | "SHARE"   "PRIVATE"   "SAVE" |
| FORM | "DEFAULT PO"   FORM ID |
| POSITION | "UNDEFINED"   POSITION INFORMATION |
| INTERIM STARUS DISPLAY | "DISPLAY"   "NON-DISPLAY" |
| REDUCED DISPLAY MODE | "REDUCED"   "NORMAL" |
| CONSTITUENT OBJECT | "NONE"   OBJECT ID LIST |
| CONNECTING OBJECT | "NONE"   OBJECT ID |
| LINK DISPLAY | "DISPLAY"   "NON-DISPLAY" |
| CONNECTING METHOD | "SHORTEST LINE"   "CIRCUMSCRIBED LINE"   "CENTER LINE"   "SOLID LINE"   "BROKEN LINE"   OTHER |
| ARRANGEMENT | "UNDEFINED"   "DEFAULT POSITION"   POSITION INFORMATION |

FIG. 10

| FUNCTION | OUTLINE |
|---|---|
| OBJECT GENERATION | WHEN PREPARATION OF OBJECT IS INDICATED, MANAGEMENT TABLE FOR OBJECT IS INITIALIZED |
| OBJECT DISCARD | WHEN DISCARD OF OBJECT IS INDICATED, MANAGEMENT TABLE FOR OBJECT IS INVALIDATED |
| OBJECT DISPLAY | DISPLAY DESIGNATED OBJECT IN ACCORDANCE WITH MANAGEMENT TABLE. CONTENT OF MANAGEMENT TABLE IS NOT CHANGED |
| OBJECT DRAW | USER DRAWS DO OR CO OBJECT FOR WHICH MANAGEMENT TABLE HAS BEEN GENERATED. CONTENT OF MANAGEMENT TABLE IS DETERMINED BASED ON RESULT OF DRAWING |
| OBJECT ERASE | ERASE DISPLAY OF DESIGNATED OBJECT. CONTENT OF MANAGEMENT TABLE IS NOT CHANGED |
| OBJECT ATTRIBUTE CHANGE | CONTENTS OF VARIOUS ATTRIBUTES OF OBJECT MANAGEMENT TABLE ARE CHANGED |
| OBJECT OPERATION MESSAGE TRANSMISSION/ RECEPTION | TRANSMIT MESSAGE INDICATING CONTENT OF OPERATION OF OBJECT. RECEIVE MESSAGE AND SELECT PROCESS IN ACCORDANCE WITH MESSAGE |

FIG. 22A

| | 143 | 145 | 147 | 144 | 146 | 148 | 150 |
|---|---|---|---|---|---|---|---|
| 600-A | 510 | DO | 502-A | | | | |
| 610-A | 530 | PO | 502-A | | | | |
| 620-A | 520 | DO | 504-A | | | | |
| 630-A | 540 | PO | 504-A | | | | |

FIG. 22B

| | 143 | 145 | 147 | 144 | 146 | 148 | 150 |
|---|---|---|---|---|---|---|---|
| 600-B | 510 | DO | 502-B | | | | |
| 610-B | 530 | PO | 502-B | | | | |
| 620-B | 520 | DO | 504-B | | | | |
| 630-B | 540 | PO | 504-B | | | | |

FIG. 22C

| | 143 | 145 | 147 | 144 | 146 | 148 | 150 |
|---|---|---|---|---|---|---|---|
| 600-C | 510 | DO | 502-C | | | | |
| 610-C | 530 | PO | 502-C | | | | |
| 620-C | 520 | DO | 504-C | | | | |
| 630-C | 540 | PO | 504-C | | | | |

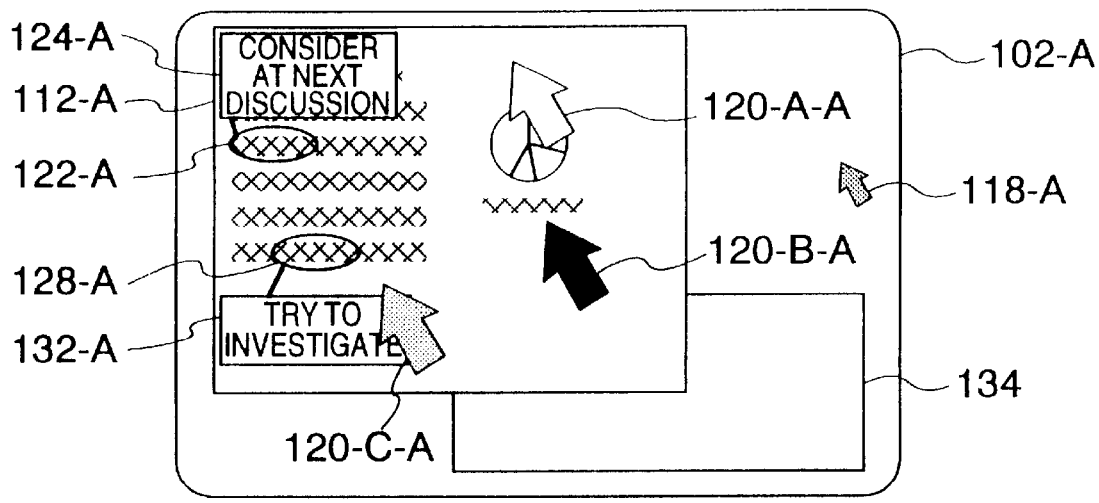
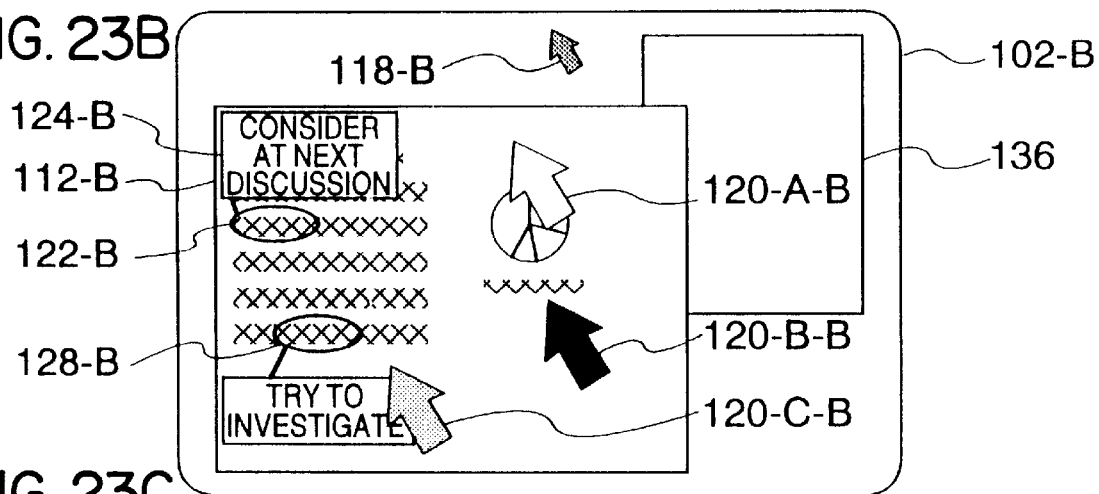
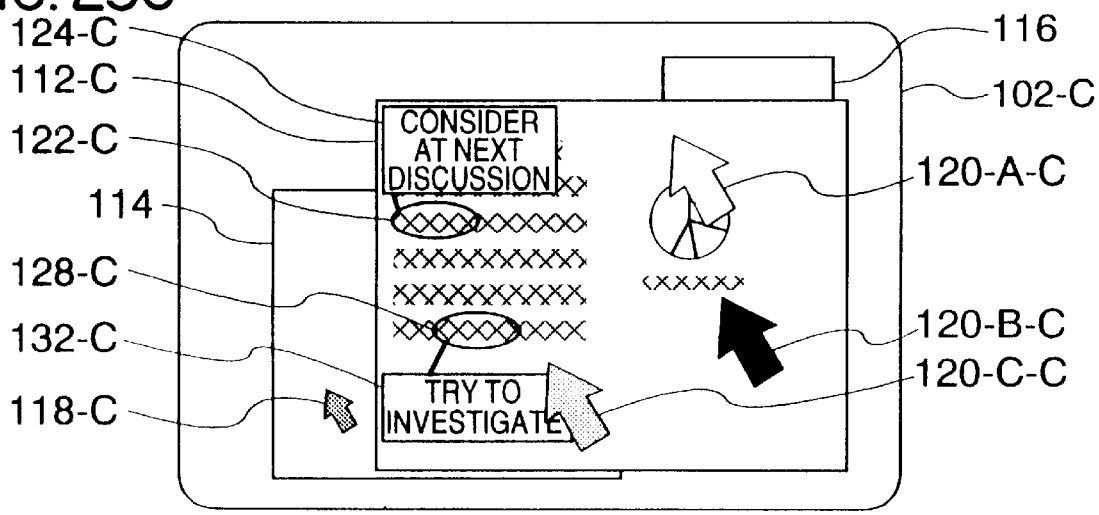

COLLABORATIVE WORK SUPPORT SYSTEM

CROSS-REFERENCE TO RELATED APPLICATION

This application is related to U.S. application Ser. No. 938,593 filed Sep. 3, 1992, now patented as U.S. Pat. No. 5,280,583 the subject matter of which is incorporated herein by reference.

BACKGROUND OF THE INVENTION

The present invention relates to a collaborative work support system utilizing a plurality of workstations or personal computers connected through a network, and more particularly to a collaborative work support system which permits control of extent of open and operation of an object displayed on a window shared by participants.

Various techniques have been proposed for tele-pointing, tele-writing and comment. Sarin, Sunil and Greif describe in "Computer-based Real-Time Conferencing System", Computer, Vol.18, No.10, October 1985 on a tele-pointing system in which each participant may have his own tele-pointer (hereinafter referred to as PO). A public PO which allows the viewing and the accessing to all participants is discussed in Stefic et al., "Beyond the Chalkboard: Computer Supports Collaboration and Problem Solving in Meetings", Comm. ACM, Vol.30, No.1, January 1987. The drawing on a shared window is realized by Watanabe et al., "Distributed Multiparty Desktop Conferencing System: MERMAID", Proc. CSCW90. Stefic et al. and Watanabe et al. provide a shared window viewable by all participants as well as a personal window for each participant which is viewable by only an individual participant. It is also known to display graphics by the tele-writing (hereinafter referred to as DO) on the shared window.

The techniques proposed by the above references are insufficient in the following points in that the PO and the DO are shared by all participants.

First, no consideration is paid on the ownership of a PO for each participant and the operation thereof on the shared window. Accordingly, no consideration is paid on the inhibition of the viewing of the PO of one participant to other participants on the shared window.

Secondly, as to the DO, the participants cannot grasp who among the participants drew a particular graphic. Further, if a participant does not want to disclose a graphic to other participants, he cannot place it on the shared window and must draw it on the personal window.

The above problems will occur when a non-real-time collaborative authoring system is to be constructed by using the techniques proposed by the above references.

SUMMARY OF THE INVENTION

It is an object of the present invention to provide a collaborative work support system which can control the displaying of an object on a shared window in a more versatile manner.

It is another object of the present invention to provide a collaborative work support system which can restrict the operation of an object displayed on a shared window in a more versatile manner.

In order to achieve the above objects, the present invention provides a collaborative work support system including a plurality of computers each having a display device connected through a communication network, comprising:

means for displaying a shared window on each display device of each of said computers;

means for accepting an entry of object from a user of one of said computers and accepting first information for designating a user or a group of users as a display attribute of the accepted object entry and also accepting second information for designating a user or a group of users as an operation attribute of the accepted object entry;

display control means for displaying an object accepted in said one computer on the shared window displayed on the display device of said one computer and displaying said object on the display devices of the computers used by the user or the users belonging to the group of users designated by the display attribute of the object; and operation means for accepting an operation entry of the object displayed on the shared window displayed on the display device of said one computer by the user of said one computer and applying the accepted operation to the object;

said operation means accepting the operation of the object only when the user entering the operation is the user or the users belonging to the group of users designated by the operation attribute of the object.

In accordance with the present invention, computers for which a user of any computer may display an object on the shared window of his own display in accordance with attribute information entered for the object and computers for which a user may conduct an operation such as the erasing for the object displayed on the shared window of his own display are limited. Thus, the user of each computer may utilize objects of various attributes such as an object which may be viewed and operated by all users and an object which may by viewed by only those users belonging to a particular group and operated by only one user in that group.

BRIEF DESCRIPTION OF THE DRAWINGS

FIG. 3 illustrates concept of a closed area in the embodiment, FIG. 8 illustrates attribute values in object management data, FIG. 10 illustrates an object operation in the embodiment, FIG. 22 shows the setting of each object management data when the display shown in FIG. 21 is made, and FIG. 23 illustrates PO, DO and CO when each of the participants has a shared window of the same content.

DESCRIPTION OF THE PREFERRED EMBODIMENTS

Figure 1:
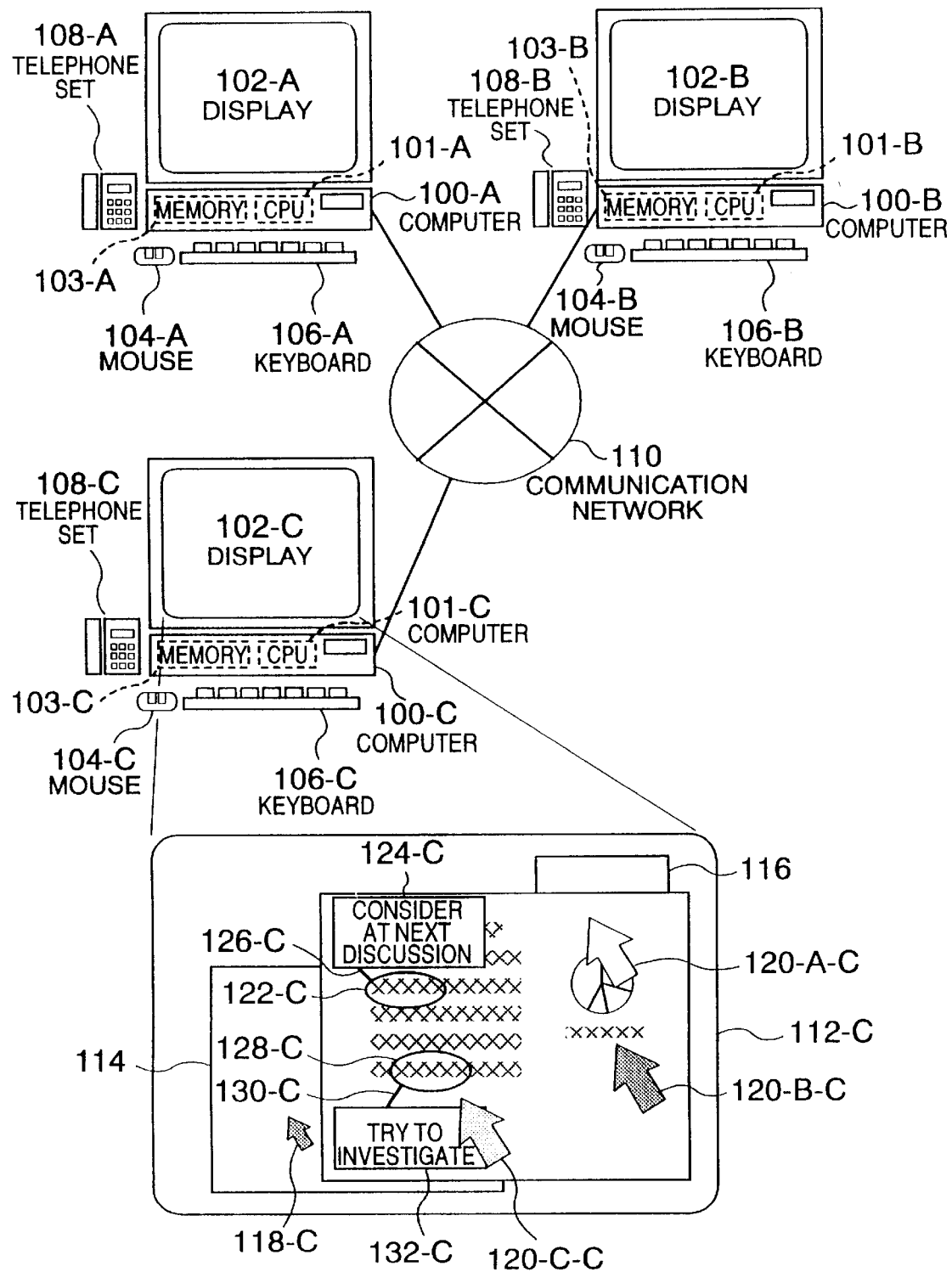
FIG. 1 shows a system configuration of a collaborative work support system in accordance with one embodiment of the present invention.

One embodiment of the collaborative work support system of the present invention is now explained with reference to the drawings. Suffix letters "-A", "-B" and "-C" attached to the reference numerals in the drawings indicate the ownership by participants A, B and C of a collaborative work. In the following description, when the users are not to be distinguished, the suffix letters are omitted.

In the following description, for the sake of simplicity, the tele-pointer is referred to as PO (Pointing Object), the tele-writing graphic is referred to as DO (Drawing Object) and the comment is referred to as CO (Comment Object). Where the distinction among the PO, DO and CO is not necessary, they are referred to as "objects".

First, before describing the detail of the embodiment, a collaborative work conducted by participants each having his own PO by displaying it on a shared window is explained with reference to FIG. 23.

It is now assumed that participants A, B and C conduct the collaborative work by using three computers connected through a network. In FIG. 23, a shared window 112 for displaying materials which are subject of the collaborative work are displayed on displays 102-A, -B and -C connected to the respective computers and each of the participants A, B and C conducts the collaborative work while he views the display respectively. A PO 120 is used to point any position on the window 112 by each of the participants A, B and C. In principle, each PO 120 is displayed at the same position on each window 112 and each participant can change the display position of his own PO. Thus, each participant, even if he is located remotely, can converse while he points the same point on the same material. In addition, the participant A uses a private window 134 and a participant B uses a private window 136. The PO 120 is operated by one participant respectively and displayed on the display of the participants other than the one participant.

DOs 122 and 128 are shared by all participants and hence each participant can view them on the shared window.

Comment objects (hereinafter referred to as COs) 124 and 132 which use the DOs attached to the DOs 122 and 128 as comments are also shared by all participants and hence each participant can view them on the shared window.

Namely, each participant can view all POs, DOs and COs used in the collaborative work on the shared window.

However, the following problem is still involved in the collaborative work shown in FIG. 23.

Namely, in FIG. 23, no consideration is paid on the mixture of the POs 120-A-A, 120-B-B and 120-C-C owned by the individual participants with the shared PO.

Further, it is not possible to grasp who prepared the DO and the CO.

Further, it is not possible to prevent each of the PO, DO and CO on the shared window from being viewed by some of the participants.

Further, the process of preparation of comment is viewable by other participants whether they need it or not.

FIG. 1 shows a system configuration of an embodiment of the present invention. As shown in FIG. 1, the system of the present embodiment comprises a plurality of computers 100 each having an input device such as a keyboard 106 and a mouse 104 and a display device such as a display 102, and a communication network 110 for connecting the computers 100. Each computer 100 has a CPU 101, an internal memory 103, an input/output interface circuit (not shown) and a communication controlling interface circuit (not shown). The internal memory 103 has an area in which a control program for managing the collaborative work (hereinafter referred to as a collaborative work program) and a work area in which various data relating to the execution of the collaborative work program are stored.

Each computer 100 also has a function to simultaneously displays a plurality of windows as well as a function allow a particular window (shared window) displayed on the display 102 of one computer 100 to be simultaneously displayed on the displays of other computers. This function is attained by executing the collaborative work program in the respective CPUs. Thus, in the present embodiment, a plurality of users can conduct the collaborative work while they refer the same window display.

The user of each computer 100, that is, each participant to the collaborative work can communicate for the start and the end of the collaborative work by using a telephone set 108 connected to a telephone line. If the communication network 110 supports the transmission of the data as well as voice, the telephone set 108 may e connected through the communication network 110.

In order to simplify the explanation, it is assumed in the following description that three computers 100-A, 100-B and 100-C are used in the collaborative work although the number of computers used may be increased or decreased within the limit of the line capacity of the network. 110.

FIG. 1 also shows a manner of the collaborative work conducted in the present embodiment as a screen display on the display 102-C viewed by the participant C. In the illustrated display, the windows 112, 114 and 116 are displayed on the display 102-C. Of those, the windows 114 and 116 are private windows for the user C on which display which has no connection with other users A and B or the collaborative work being conducted is made. On the other hand, the window 112-C is the shared window and the same content of the window 112-C is displayed on the displays 102 which are viewed by the participants A and B. Each participant conducts the collaborative work while he views the shared window.

The content of the display on the window 112-C is explained in more detail. Numeral 120 denotes a tele-pointer which is used by each of the participants A, B and C to point any position on the window 112. Suffix letters "-X-Y" attached to the numeral indicates that it is owned by the user X and displayed on the display of the user Y. For example, the tele-pointer 120-A-C is the tele-pointer owned by the participant A and displayed on the display 102-C of the participant C. In principle, each tele-pointer 120 is displayed at the same position on each window 112 and each participant can change the display position of his own tele-pointer by operating the mouse 104. Thus, each participant, even if he is located remotely, can converse while he points the same point on the same material. The "owner" will be described later in detail.

In the present embodiment, the user can operate the tele-pointer as well as the tele-writing. The tele-writing is a function to allow the drawing of graphic (tele-writing graphic) such as a free curve on the shared window 112 by the participants of the collaborative work by operating the mouse and/or the keyboard 106. The graphics 122-C and 128-C on the shared window 112-C resulted from the tele-writing.

The system of the present embodiment is provided with a function to add a comment in a separate form in order to avoid a problem caused by the overlapping of the comment over other display. Specifically, the data constituting the comment is entered in association with the tele-writing graphic and the result is displayed on the comment windows 124-C and 132-C. In order to offer clear visual correspondence of the tele-writing graphic and the added comment, they are linked by segments 126-C and 130-C called comment links.

The system of the present embodiment is also provided with a function to set attributes to the tele-pointer, the tele-writing graphic and the comment and a function to control the display and the access for the tele-pointer, the tele-writing graphic and the comment in accordance with the attributes.

The system of the present embodiment is provided with all of the PO, DO and CO although it is not always necessary. It is apparent that a system which does not simultaneously provide all of them may be equally constructed.

Features of the system of the present embodiment are now explained with reference to the display examples (FIGS. 2–6) of each display 102.

Figure 2A:
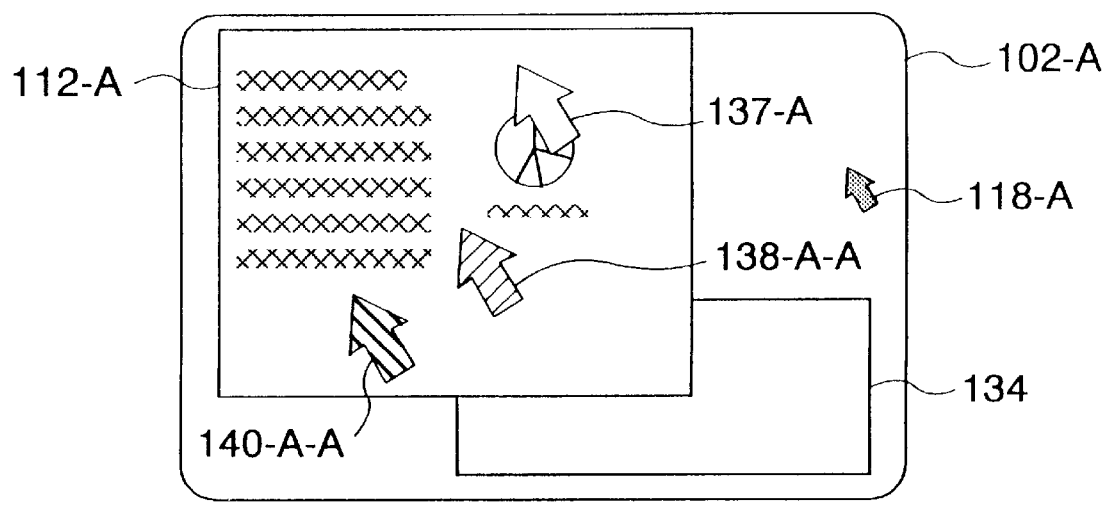
FIG. 2 illustrates concept od sharing, an open individual and a non-open individual in the embodiment.
Figure 2B:
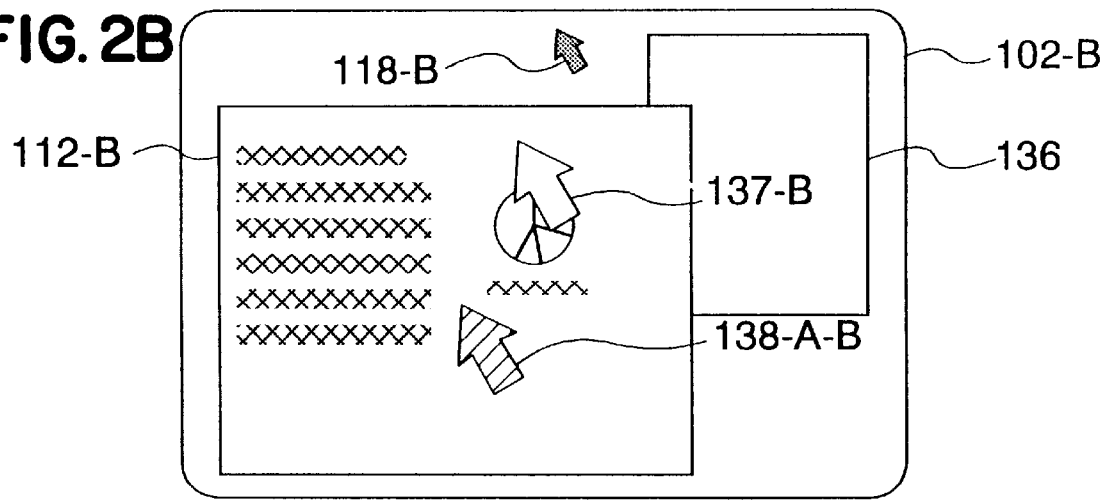
Figure 2C:
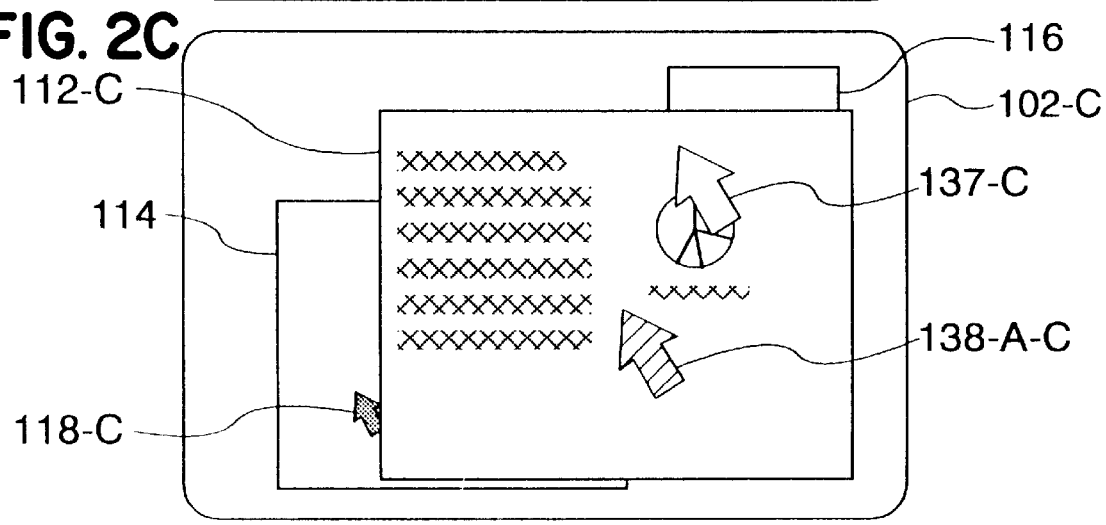

FIG. 2 illustrates the function of "share" and "open" which is a feature of the present system. A status of the window shown on each display 102 is same as that shown in FIG. 23. For the sake of simplicity, the PO is explained here as a representative example. It will be later described that the DO and the CO can be handled in the same manner.

Unlike in FIG. 23, all of POs 137, 138-A and 140-*a* are authored by the participant A. The terms "author" and "owner" hereinafter used have the following meanings. The author means the participant who executes a generation process (to be described later) of the object and the owner means the participant who has a right to operate the object, that is, who is permitted move, delete, modify or otherwise operate the object. In FIG. 23, those three POs are viewable by all participants and operable by only the participant A.

In FIG. 2, firstly, the PO 137 is one having the attribute indicating the "ownership" set thereto. The author of the PO is the participant A but all of the participants have the right to operate the PO and all of the participants can view the display of the PO. Such PO is referred to as a "shared PO".

Secondly, the PO 138-A is one having the attribute indicating "open" set thereto, and the participant A is the author of the PO as well as the owner of the PO. Namely, only the participant A have the right to operate the PO but the PO is displayed on the displays 102 of all participants. Such PO is referred to as an "open private PO".

Lastly, the PO 140-A is one having the attribute indicating "non-open private" set thereto. The participant A is the author of the PO as well as the owner of the PO and the PO is not displayed on the display 102 of the participants other than the participant A. Such PO is referred to as a "non-open private PO".

The above attributes applied to the PO are also applicable to the DO and the CO. A "shared DO" is viewable by all participants without regard to the author and any participant can modify or delete the DO. An "open private DO" can be viewed by all participants without regard to the author but only the author as the owner can modify or delete the DO. A "non-open DO" can be viewed by only the author as the owner and only the author can modify or delete the DO.

It is apparent that the attributes of share, open private and non-open private can be equally set to the CO.

A function of "closed area share" which is another feature of the present embodiment is explained with reference to FIG. 3. Again, only the PO is described as a representative for the DO and the CO.

In FIG. 3, the same attributes as those shown in FIG. 2 are set to the POs 142, 144-A and 146-A and an additional attribute indicating a closed area comprising two participants A and B (a sub-set of the participants) is further set to each of the POs. The setting of the closed area leads to a status in which the display of the PO and the access to the PO are limited to the participants group included therein. Firstly, the PO 142 has the attribute of share but the attribute is effective only in the closed area. Thus, the PO 142 is not displayed on the shared window of the participant C and only the participants A and B can operate the PO 142. Secondly, the PO 144-A has the attribute of open private but due to the limitation to the closed area, the PO 144-A is not displayed to the participant C and only the participant A has the right to operate the PO 144-A. The PO 146-A which has the attribute of non-open private is displayed on only the display 102-A of the participant A and only the participant A has the right to operate the PO 146-A.

The views of the PO by the participants A and B are same as those viewed when the closed area is not set. Non-setting of the attribute of the closed area is equivalent to defining the closed area to all participants. Namely, in the present embodiment, even if the closed area for the participants A, B and C is set, the display and the operation of the PO are not limited thereby. It should be noted, however, that if a new participant joins, the closed area becomes a closed area which is subject to the limitation.

It is apparent that the above discussion on the closed area equally applies to the DO and the CO.

The system of the present embodiment has a function to change the attributes explained in FIGS. 2 and 3. For example, if a closed area is designated by a participant to the object having the attribute of share set thereto in the course of the collaborative work, the object is erased from the display on the displays 102 of the participants not included in the closed area. Alternatively, when the attribute of open private is set to a share object by the owner, the display status is not changed but the participants other than the owner can no longer operate the object.

Figure 4A:
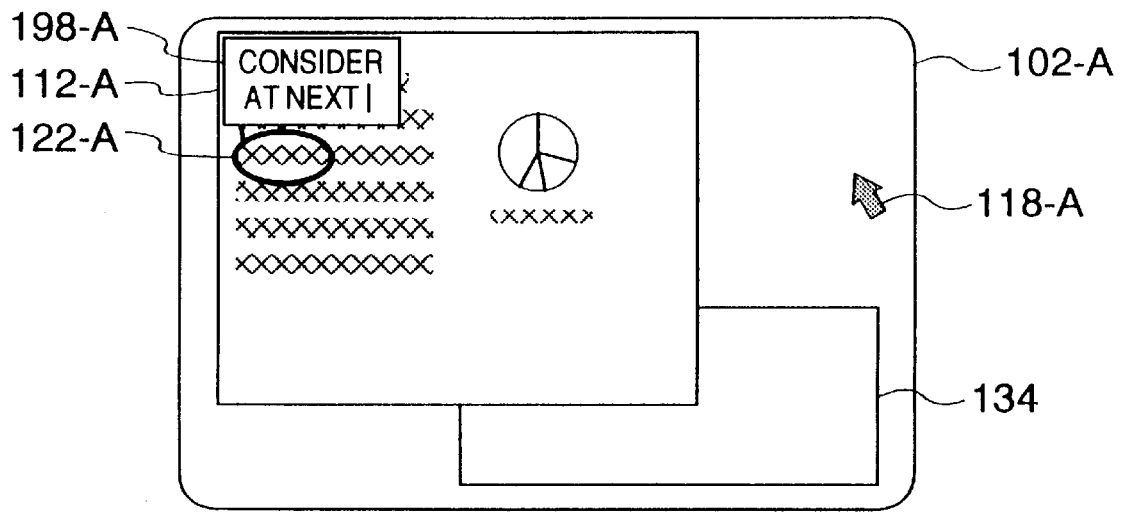
FIG. 4 illustrates interim status display in the embodiment.
Figure 4B:
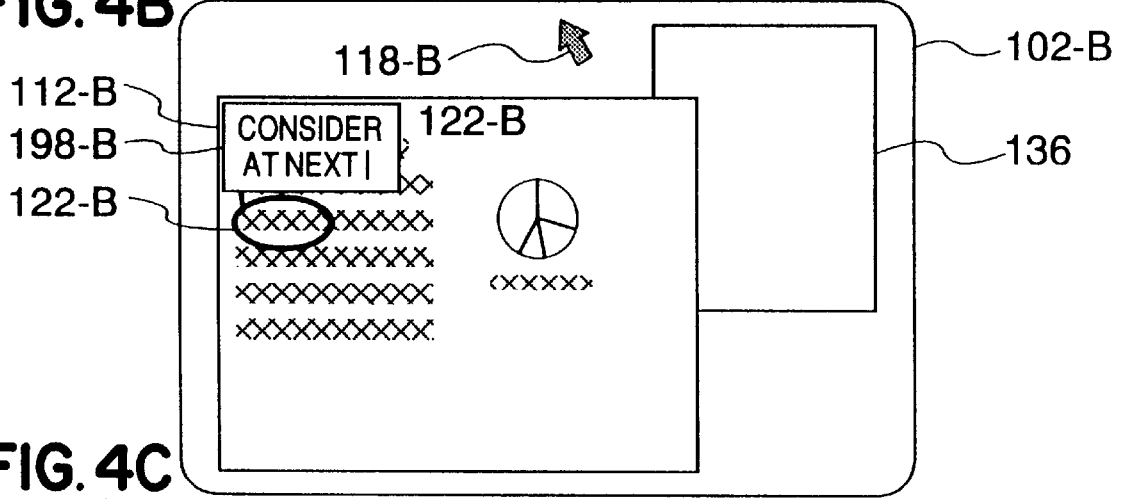
Figure 4C:
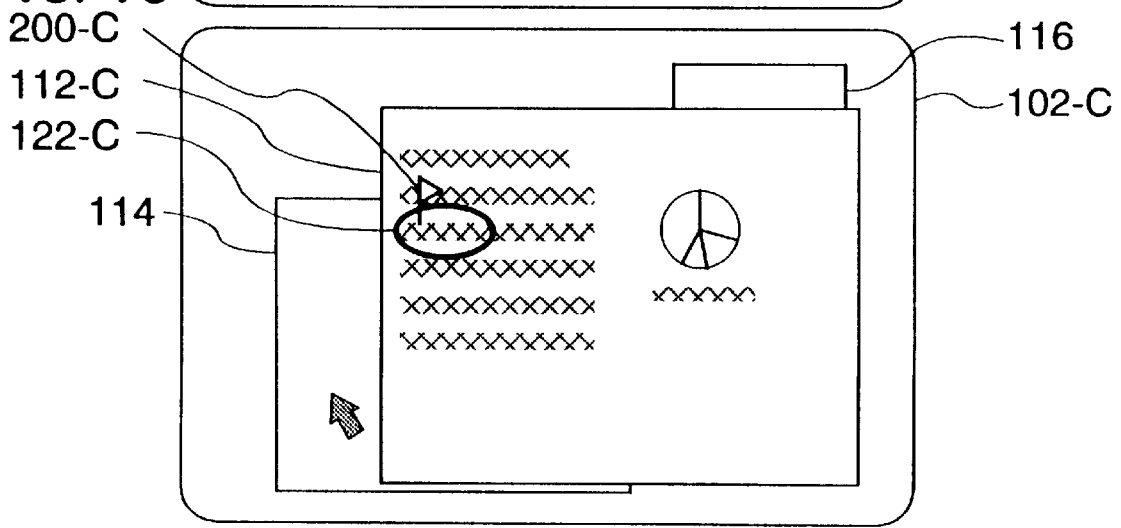
Figure 5A:
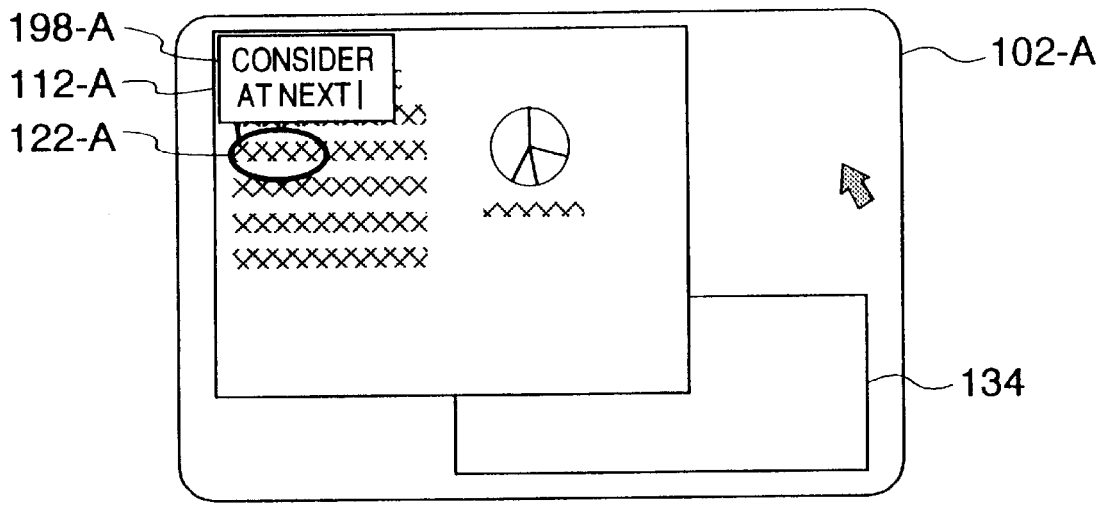
FIG. 5 illustrates interim status display in the embodiment.
Figure 5B:
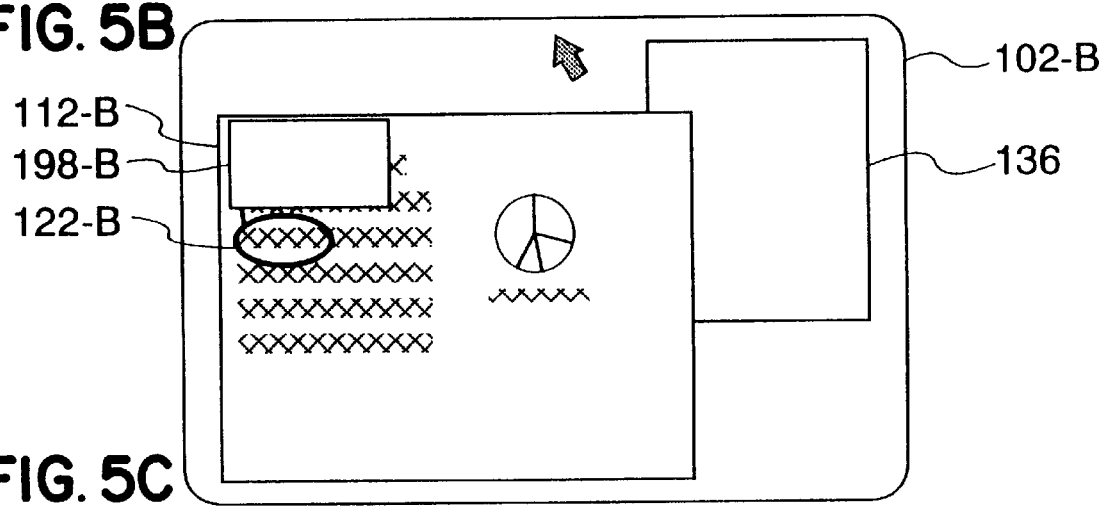
Figure 5C:
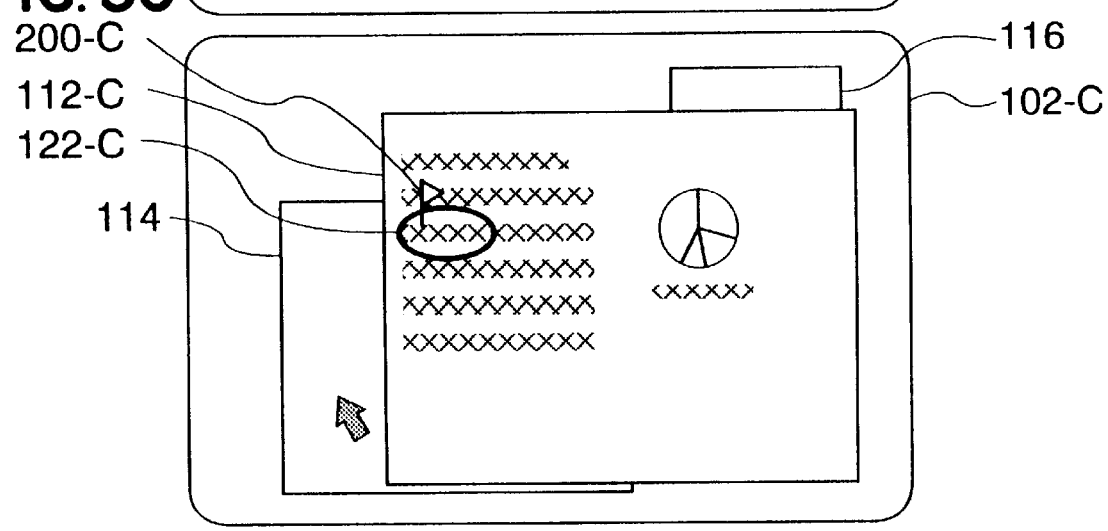
Figure 6A:
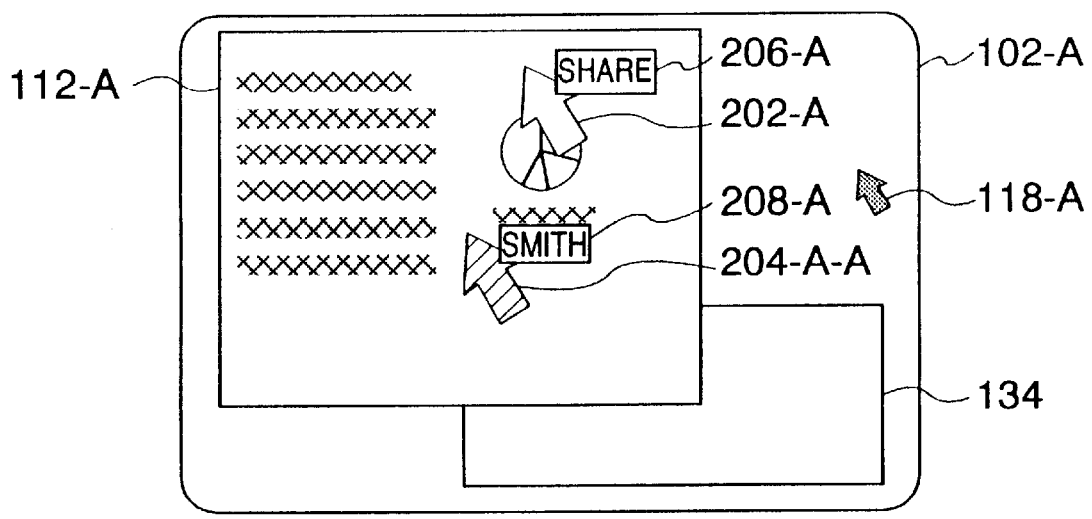
FIG. 6 illustrates indicator display in the embodiment.
Figure 6B:
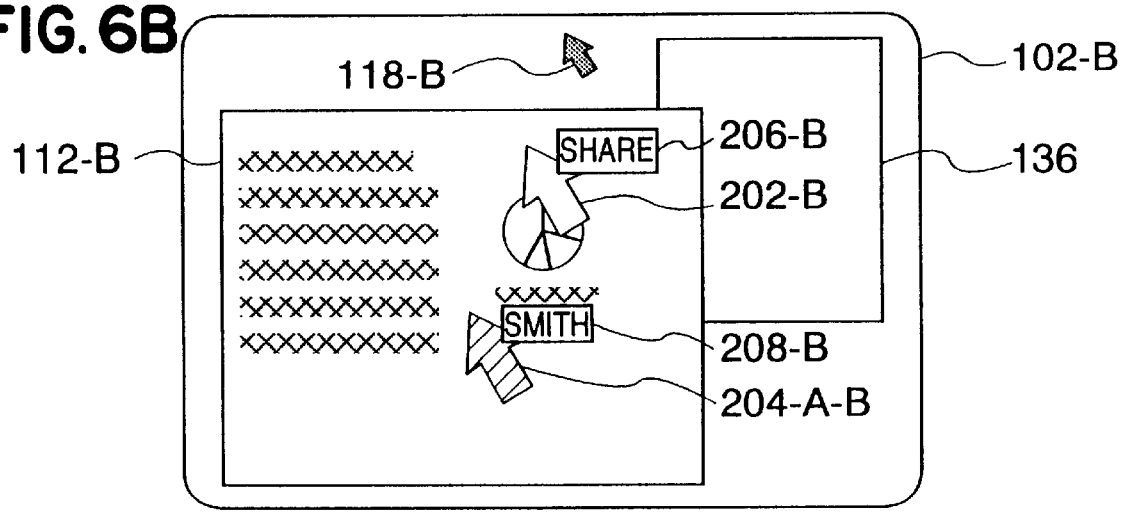
Figure 6C:
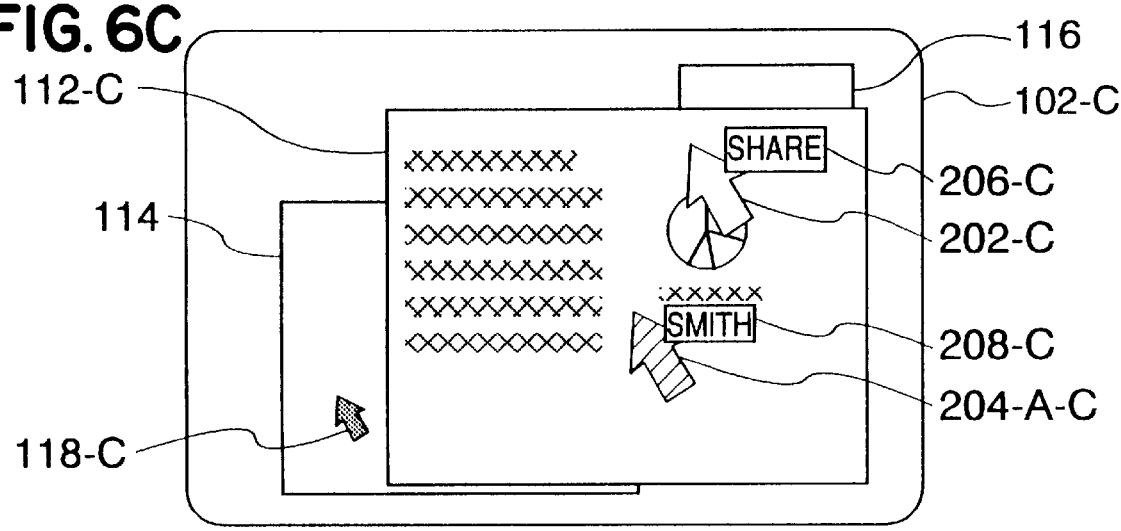

Referring to FIGS. 4–6, other feature of the system of the present embodiment is explained.

FIG. 4 illustrates a function of displaying an interim status during the preparation of the comment in the system of the present embodiment. In FIG. 4, the participant A is preparing a shared CO to be attached to the DO 122 on a comment window 198-A. An attribute indicating the display of the interim status has been set in the CO. At the participant C, an attribute indicating a reduced display has been set in the CO. In this case, as seen, from the display on the comment window 198-B, the participant B can view the manner of preparation of the comment by the participant A on real time basis. The participant can also see the process of preparation but since the attribute indicating the reduced display has been set in the CO, only a marker 200-C indicating the presence of the CO is displayed on the shared window 112-C of the participant C.

FIG. 5 shows a case where the interim status for the preparation of comment is not displayed. In FIG. 5, the participant A is preparing the shared CO to be attached to the DO 122 on the comment window 198-A and the attribute indicating the non-display of the interim status has been set in the CO. Like in the case of FIG. 4, the attribute indicating the reduced display has been set in the CO at the participant C. As seen from the display on the comment window 198-B, the participant B cannot directly view the process of preparation of the comment by the participant A. The participant C can also not view it but since the attribute indicating the reduced display has been set in the CO, the same status as that shown in FIG. 4 happens to the participant.

FIG. 6 illustrates a function of displaying an indicator in the system of the present embodiment. In FIG. 6, the PO 202 is shared by the three participants A, B and C and the attribute indicating the display of the indicator has been set in the PO 202. As a result, markers 206-A, 206-B and 206-C indicating the "share" are displayed adjacent to (partially overlapped) the POs 202-A, 202-B and 202-C, respectively. On the other hand, the PO 204-A is privately owned by the participant A, and the attribute indicating the display of the indicator has been set in the PO 204-A. Thus, markers 208-A, 208-B and 208-C indicating that the participant A is owned by Mr. Smith are attached to the POs 204-A-A, 204-A-B and 204-A-C displayed on the displays 102 of the respective participants. In this manner, by the attachment of the indicator to the object such as PO, the owner of the object can be readily identified.

Specific configuration and operation for implementing the functions of the present system described above are now explained.

Figure 7:
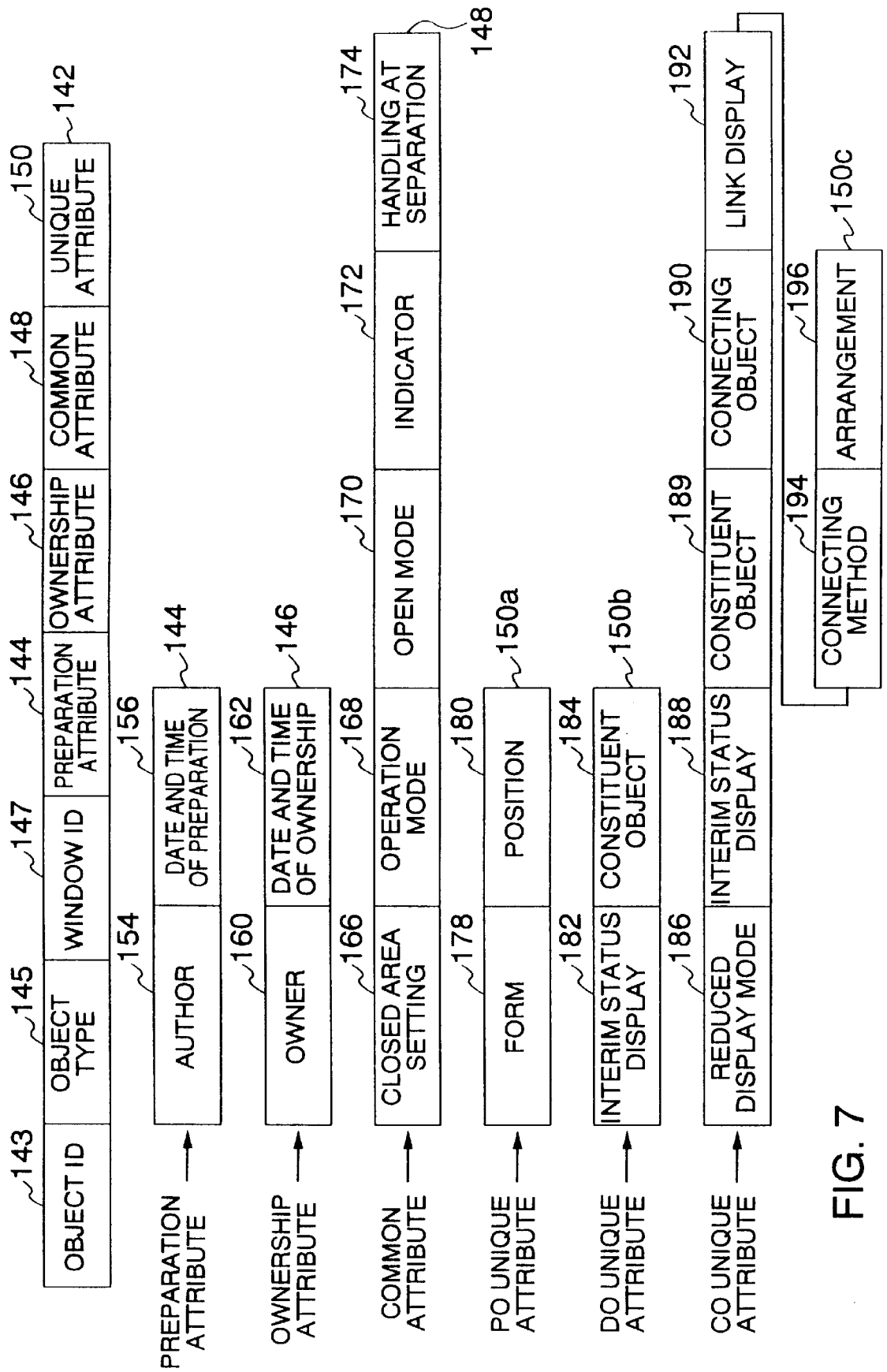
FIG. 7 shows a format of object management data used in the embodiment.

FIG. 7 shows a format of object management data used to display the object. The object management data 142 shown in FIG. 7 is generated one for each object prepared by the participant and stored in a work area of the internal memory of the computer 100.

As shown in FIG. 7, the object management information 142 comprises an object ID 143, an object type 145, a window ID 147, an preparation attribute 144, an ownership attribute 146, a common attribute 148 and a unique attribute 150. The object ID 143 is identifier data used to refer the object, the object type 145 is identifier data to indicate whether the object is PO, DO or CO, and the share window ID 147 is identifier data indicating the window on which the object is to be displayed. The preparation attribute 144 is data on the preparation of the object and includes an author 154 and date and time of the preparation 156. The ownership attribute 146 is data on the ownership of the object and includes an owner 160 and date and time of ownership 156.

The common attribute 148 is data on the attribute common to the objects other than the preparation attribute 144 and the ownership attribute 146. The common attribute 148 includes a closed area setting 166, an operation mode 168, an open mode 170, an indicator 172 and handling at separation 174. The closed area setting 166 is data indicating the setting of the closed area, the operation mode 168 is data indicating whether the object is shared or privately owned, the open mode 170 is data indicating whether the object is opened to those other than the owner or not, and the indicator 172 is data indicating whether the marker indicating the owner is to be attached to the object or not. The handling at separation 174 is data for determining the attribute setting of the object (for example, the current attribute setting is used as it is or a default attribute setting is used) when the collaborative work is completed or the shared window 112 is separated from the collaborative work or stored as a file. By this information, the collaborative work may be completed with the current attribute data. In this case, when the DO owned by the participant B is saved by the participant A, it may happen that the participant A can no longer delete the DO. The attribute data on the handling at the separation will be explained in more detail later.

The unique attribute 150 is information indicating the attribute unique to each of the objects of the PO, DO and CO. One of the data on the unique attribute 150a of the PO, the unique attribute 150b of the DO and the unique attribute 150c of the CO is set in the unique attribute 150.

The unique attribute 150a of the PO includes a form 178 and a position 180. The form 178 is data indicating a form (shape, color, pattern, etc.) to be taken when the PO is displayed. The position 180 is data indicating the current display position of the PO.

The unique attribute 150b of the DO includes an interim status display 182 and a constituent object 184. The interim status display 182 is data indicating whether the interim status during the preparation of the Do is to be shown to the participants other than the author or not. The constituent object 184 is a list of graphics constituting the DO. The list herein used means a pointer string for designating a memory area which contains a plurality of different shapes of graphics constituting the DO. For example, when an arrow which is a combination of a triangular and a rectangle is to be displayed, two pointers pointing the areas in which shape data of the triangle and the rectangle are stored are set in the constituent object 184.

The unique attribute 150c of the CO includes a reduced display mode 186, an interim status display 188, a constituent object 189, a connection object 190, a link display 192, a connecting method 194 and an arrangement 196. The reduced display mode 186 is data indicating whether the CO is to be displayed with the comment window (124-C shown in FIG. 1) being open or only the marker indicating the presence of the CO is placed on the shared window (reduced display). The interim status display 188 is data indicating whether the interim status during the preparation of the CO is to be shown to the participants other than the author or not. The constituent object 189 is a list indicating graphics and characters constituting the CO. Specifically, the list is a pointer string for designating a memory area in which character information and graphic information constituting the CO are stored. For example, when the CO is to be displayed by a combination of a text and an underscored segment, two pointers pointing the areas in which the text and the segment data are stored are set in the constituent object 189.

The link display 192 is data to indicate whether the DO to which the CO is to be attached and the comment window are to be linked by the comment link (126-C in FIG. 1) or not when the CO is displayed on the comment window. The connection method 194 is data indicating a draw form of the comment link. By this data, where in the comment window and the DO the comment link is to be displayed, whether it is by a solid line or a broken line and whether it is by a narrow line or a thick line are designated. The arrangement 196 is data representing a positional relation among the DO to which the CO is to be attached, the comment window and the marker in the reduced display mode.

The material which is the subject of the collaborative work, that is, the image to which the DO or the CO is to be attached may be handled as the DO. For example, the bit map data characters and graphic data constituting the image of the material may be collectively stored in a specified area of the internal memory and a pointer pointing the top of the specified area may be set in the constituent object 184 of the unique attribute 150b of the DO.

FIG. 8 show a relation between the attributes included in the object management data explained in FIG. 7 and the attribute values set therein. The attribute values are names of actual data classes. The attribute values expressed in the form of "xyz" may be considered as the character strings per se indicated by the data. The attribute values encircled by rectangles are used as default values unless otherwise specified. The attribute values are now explained in sequence.

For the "author" attribute, a <user ID> of a user who instructed the generation of the object is used.

For the "date and time of preparation", <date and time> at which the object is prepared is used.

For the "owner", a <user ID> of the user who is designated as the owner of the object is used. A default value is <author>. A group ownership may be set. Examples are <group ID> and <all participants>. When the <all participants> is selected, it may be considered that it means the sharing of the object. The group (group 1) indicated by the <group ID> used for the "owner" may be different from the group (group 2) indicated by the <group ID> of the "closed area setting" to be described later. For example, when the group 2 covers the group 1, the participants of the group 1 which is a sub-group of the group 2 can handle, without restriction, the objects which they own. For the "date and time of ownership", <date and time> at which the owner of the object was set is used. A default value is <date and time of preparation>.

For the "closed area setting", a code representing a user group expressing the closed area is used. A default value is <all participants>. This attribute value is not affected by the increase or decrease of the participants. Further, the <group ID> is a code assigned to the group and the <user list> is a listing of the <user IDs> of the users included in the group. The <group ID> may be added to the <user list>.

For the "operation mode", a subject to which the right to operate the object is set. When the attribute is <private>, the participant indicated by the "owner" has the right to operate the object. For the "open mode", the name of the display addressee of the object is used. When the attribute is <open>, all participants designated by the "closed area setting" can view the object. When it is <non-open>, only the participant indicated by the "owner" can view the object.

The "indicator" indicates whether the marker having the content indicated by the "operation mode" is to be attached to the object or not. If the "operation mode" is <share>, the marker indicating the "share" is attached to the object. If the "operation mode" is <private>, the marker indicating the owner name is attached to the object. The owner name may by an individual name or a group name.

The "handling at separation" indicates the manner of handling of the object when the shared window separates from the collaborative work. When the attribute is <common>, the "owner" is set to <share>, the "open mode" is set to <open> and the "indicator" is set to <non-display> in the management data of all objects. When the attribute is <private>, the "owner" is set to <user ID> of the site, the "closed area setting" is set to the said <user ID>, the operation mode" is set to <private>, the "open mode" is set to <non-open> and the "indicator" is set to <non-display> in all objects. When the attribute is <save>, the current attribute values are saved as they are in all object management data.

An attribute value indicating the form of display of the PO at the site is set in the "form". When the attribute is <default PO>, the PO is displayed in a predetermined from. When it is <form 1>, the form data indicated by the ID is used.

An attribute value indicating whether the preparation of the DO and the CO by the owner and the interim status of preparation are to be shown to other participants or not is set in the "interim status display". When the attribute value is set to <non-display>, the status is displayed on the windows of other participants when the preparation of the DO or CO is completed.

An attribute value indicating whether the CO is in the marker status (reduced) or opened as the comment window is set in the "reduced display mode".

An attribute value indicating a list of graphics constituting the DO and CO is set in the "constituent object". "None" as the attribute value occurs at an initial state of the preparation or when the existing constituent object is deleted.

An identifier (<object ID>) of the DO to which the CO is to be attached is set in the "connecting object". The attribute value "none" may be set in the "connecting object" and when it is so set, it is regarded that the CO is generated for the shared window.

A characteristic value indicating whether the comment window is to be linked to the "connecting object" or not is set in the "link display".

An attribute value indicating the manner of linking of the comment window to the object indicated by the "connecting window" is set in the "connection method".

An attribute value indicating the positional relation of the comment window and the object indicated by the "connecting object" is set in the "arrangement". Of the attribute, <"undefined"> is set when the CO is generated. All computers for conducting the collaborative work store the same attribute value for all objects on the shared window.

Thus, in the present embodiment, in order to assure that a uniform object operation is conducted in all computers 100, the content of the operation for the object conducted on one of the computers 100 is transmitted to all other computers as message data.

Figure 9:
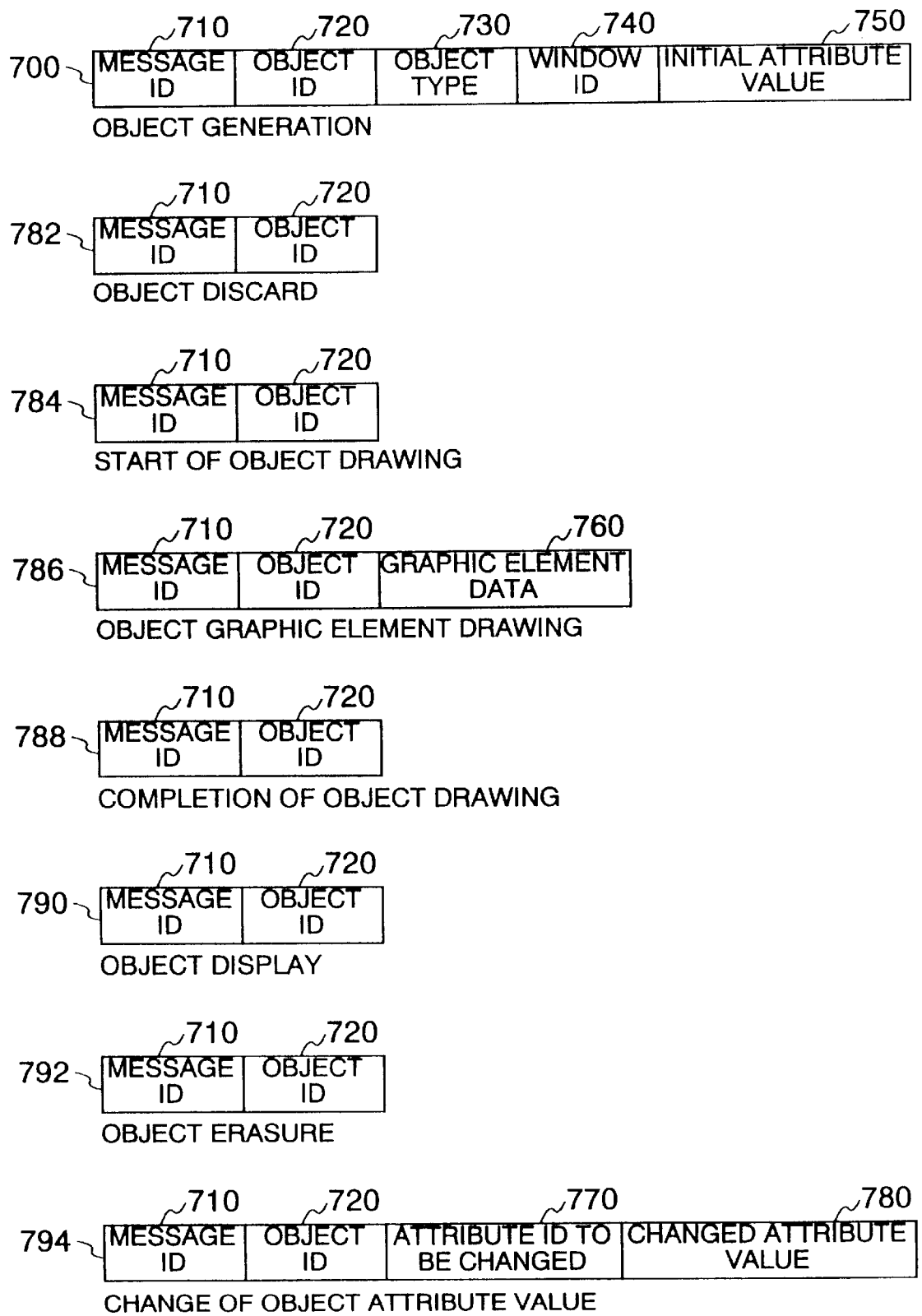
FIG. 9 shows a format of an object operation message used in the embodiment.

FIG. 9 shows a format of the message data issued to the computers of all participants when one participant operates the object. In FIG. 9, numeral 700 denotes message data issued when the object is generated, numeral 782 denotes message data when the object is discarded, numeral 784 denotes message data indicating the start of interactive drawing of the DO or CO object, numeral 786 denotes message data when the content of drawing is sequentially transmitted, numeral 788 denotes message data when the drawing is completed, numeral 790 denotes message data when the object is displayed, numeral 729 denotes message data when the display of the object is erased, and numeral 794 denotes message data when the attribute value of the object is changed.

In those message data, the message ID 710 is identifier data indicating the type of message. The object ID 720 is the identical data to the object ID (FIG. 7) of the object to be operated. The object type 730 is the identical data to the object type 145 of the object to be generated. The window ID 740 is the identical data to the window ID 147 of the window on which the object is displayed. The graphic element data 760 is data indicating the graphic information to be additionally drawn to the DO being drawn. The modification object attribute 770 is data indicating the type of the object to be modified.

In the present embodiment, the object is operated equally by the computers of all participants although it is possible to handle a particular object at a particular site by transmitting the above message data to only the computer 100 (site) of the particular participant. For example, in order to generate the object to be viewed by only the particular site, it may be attained by transmitting the object generation message 700 to only the particular site.

Referring to the flow chart, the operation of the system of the present embodiment is now explained in detail.

FIG. 10 shows an outline of the function relating to the object operation of the present system. In the present embodiment, the collaborative work program is provided with a program for attaining the functions shown in FIG. 10 as sub-routines and various processes can be executed by combining the sub-routines.

Figure 11:
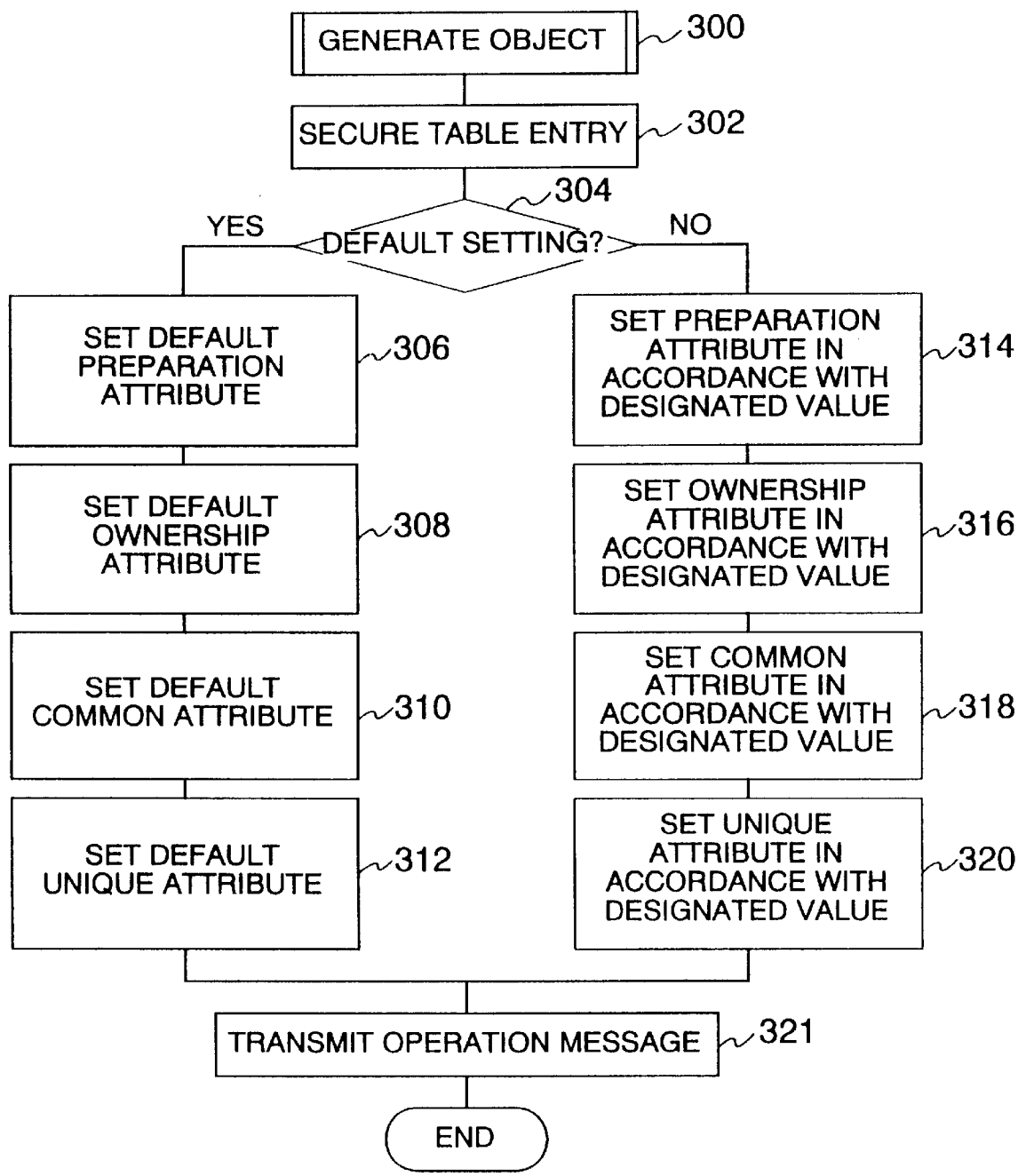
FIG. 11 shows a flow chart of a process for generating an object in the embodiment.

FIG. 11 shows a flow chart of the operation of the computer 100 when the object is generated. When the user indicates the generation of the object by operating the mouse, an object generation process 300 is started. First, a storage area for the object management data 142 (FIG. 7) is secured in the main memory, and a table entry is secured in an area for registering the object of the work area (step 302). Then, when the user indicates to set the attribute values of the object to the default values (step 304), the default attribute values (FIG. 8) are set in the preparation attribute 144, the ownership attribute 146, the common attribute 148 and the unique attribute 150 of the object management data 142 (steps 306, 308, 310 and 312). When the user desires his own setting of the attribute value (NO in step 304), the user-specified values are set in the above attributes (steps 314, 316, 318, 320). Finally, the operation message 700 (FIG. 9) to generate the object is transmitted to other computers (step 321).

Figure 12:
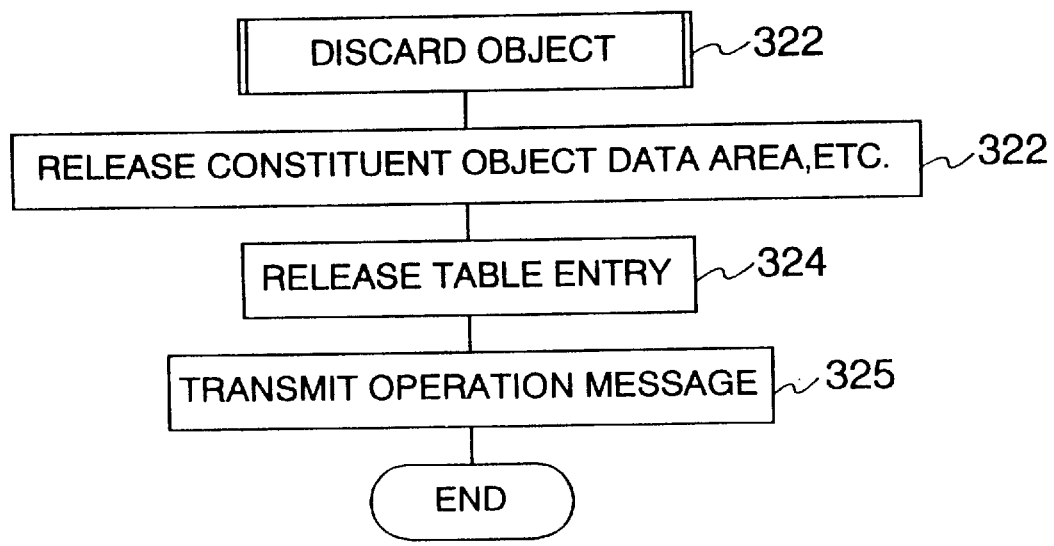
FIG. 12 shows a flow chart of object discarding in the embodiment.

FIG. 12 shows a flow of a process when the object is to be discarded. When the discarding of the object and the object to be discarded are designated by the user, the object discard process 322 is started. First, the storage area of the object management table 142 corresponding to the designated object is released (step 323) and the table entry of the object is released (step 324). The released area may be reserved for a newly registered object. Finally, the operation message 782 (FIG. 9) to discard the object is transmitted to other computers 100 (step 325).

Figure 13:
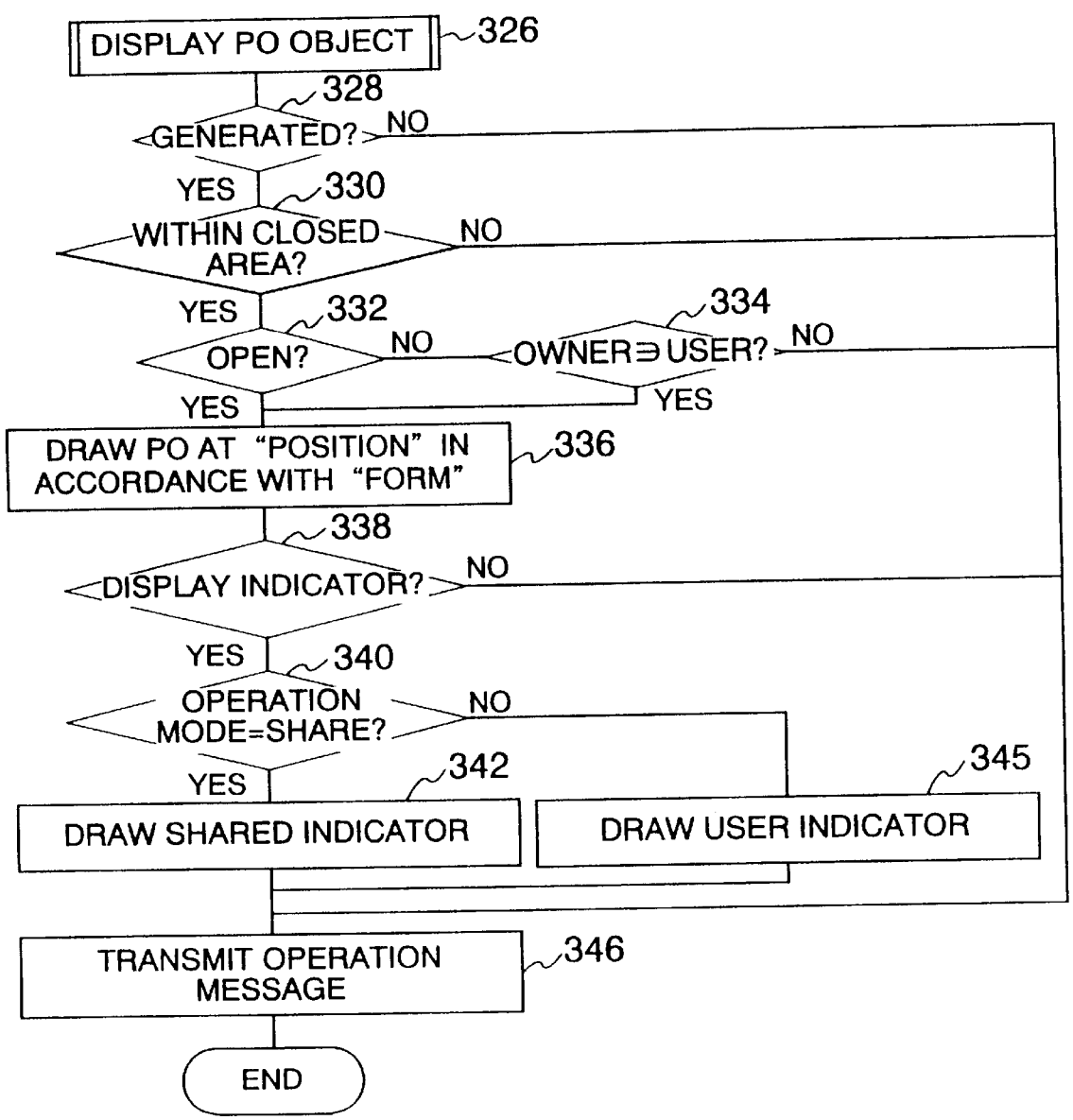
FIG. 13 shows a flow chart of a process of PO object display in the embodiment.

FIG. 13 shows a flow of a process when the PO object is to be displayed.

When the display of the PO object is indicated to the computer 100 by a user or in a particular process of the computer 100, the PO object display process 326 is started. First, whether the table entry for the PO object is secured or not (step 328), whether the participant who desires to display the PO is included in the group set as the closed area or not (step 330), whether the PO is open or not (step 332) and whether the participant is included in the owner of the PO or not (step 334) are sequentially confirmed from the settings of the attribute values of the object management data 142.

If the above is met, the PO is displayed at the position indicated by the position 180 in the form indicated by the form 178 of the unique attribute 150a (step 336). If the "display" has been set in the indicator 172 (YES in step 338), the indicator indicating the share (step 342) or the indicator indicating the owner (step 345) is drawn at the position to explicitly indicate the correspondence to the PO in accordance with the setting of the operation mode 168 (step 340) (see FIG. 6). Finally, the operation message 790 (FIG. 9) to display the object is transmitted to other computers 100 (step 346).

Figure 14:
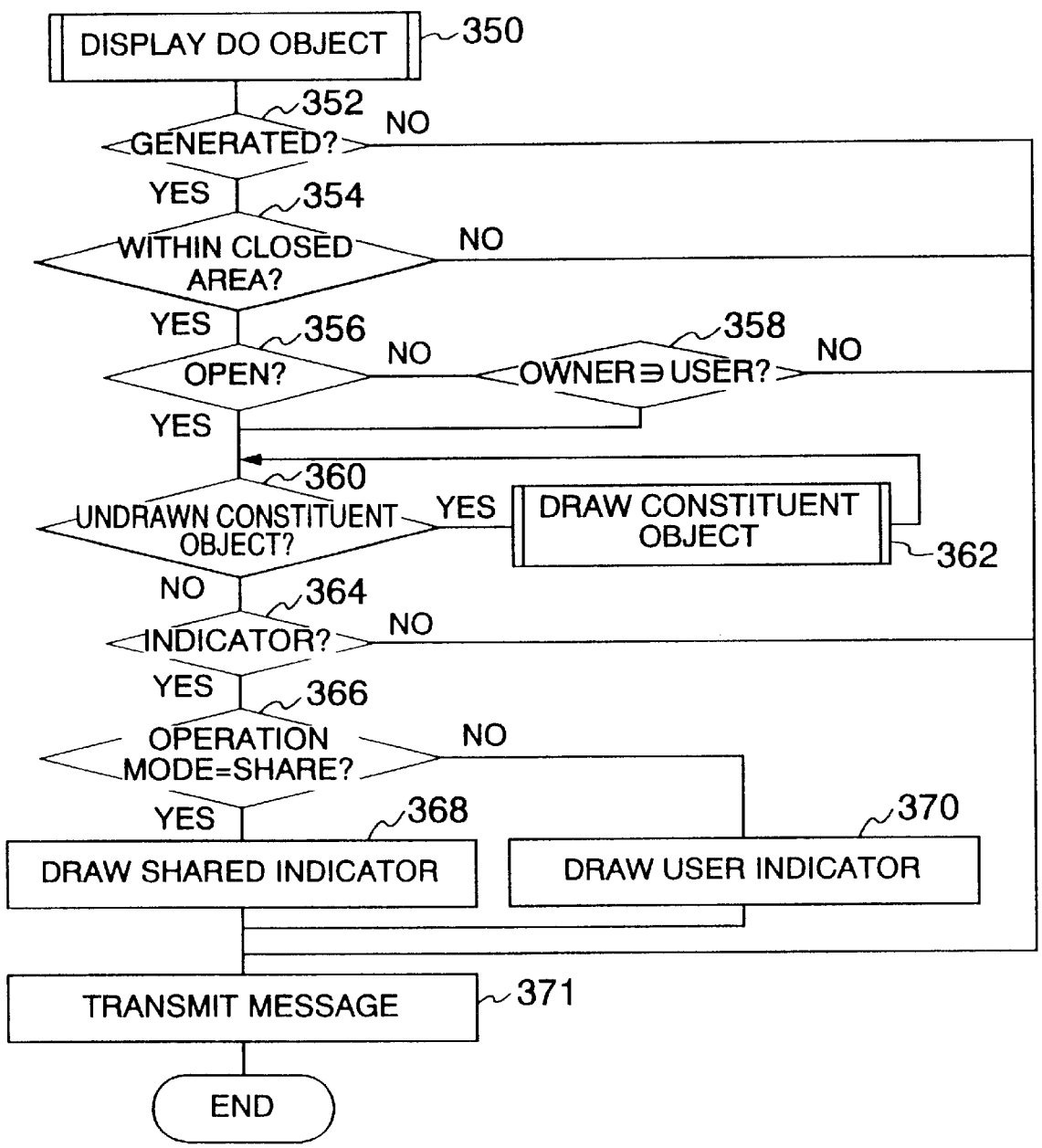
FIG. 14 shows a flow chart of a process of DO object display in the embodiment.

FIG. 14 shows a flow of a process when the DO object is to be displayed. When the display of the DO object is indicated to the computer 100 by the user or in a particular process of the computer 100, the DO object display process is started. First, whether the table entry for the DO is secured or not (step 352), whether the participant who desires to display the DO is included in the group set as the closed area or not (step 354), whether the DO is open or not (step 356) and whether the participant is included in the owner of the DO or not (step 358) are sequentially confirmed from the settings of the attribute values of the object management data 142. If the above is met, all of the graphics indicated by the constituent object 184 for the DO are displayed (steps 360 and 362). If the "display" is set in the indicator 172 (YES in step 364), the indicator indicating the share (step 368) or the indicator indicating the user as the owner (step 370) is drawn at a particular position of the DO in accordance with the setting of the operation mode 168 (step 366). Finally, the operation message 790 (FIG. 9) to display the object is transmitted to other computers 100 (step 371).

Figure 15:
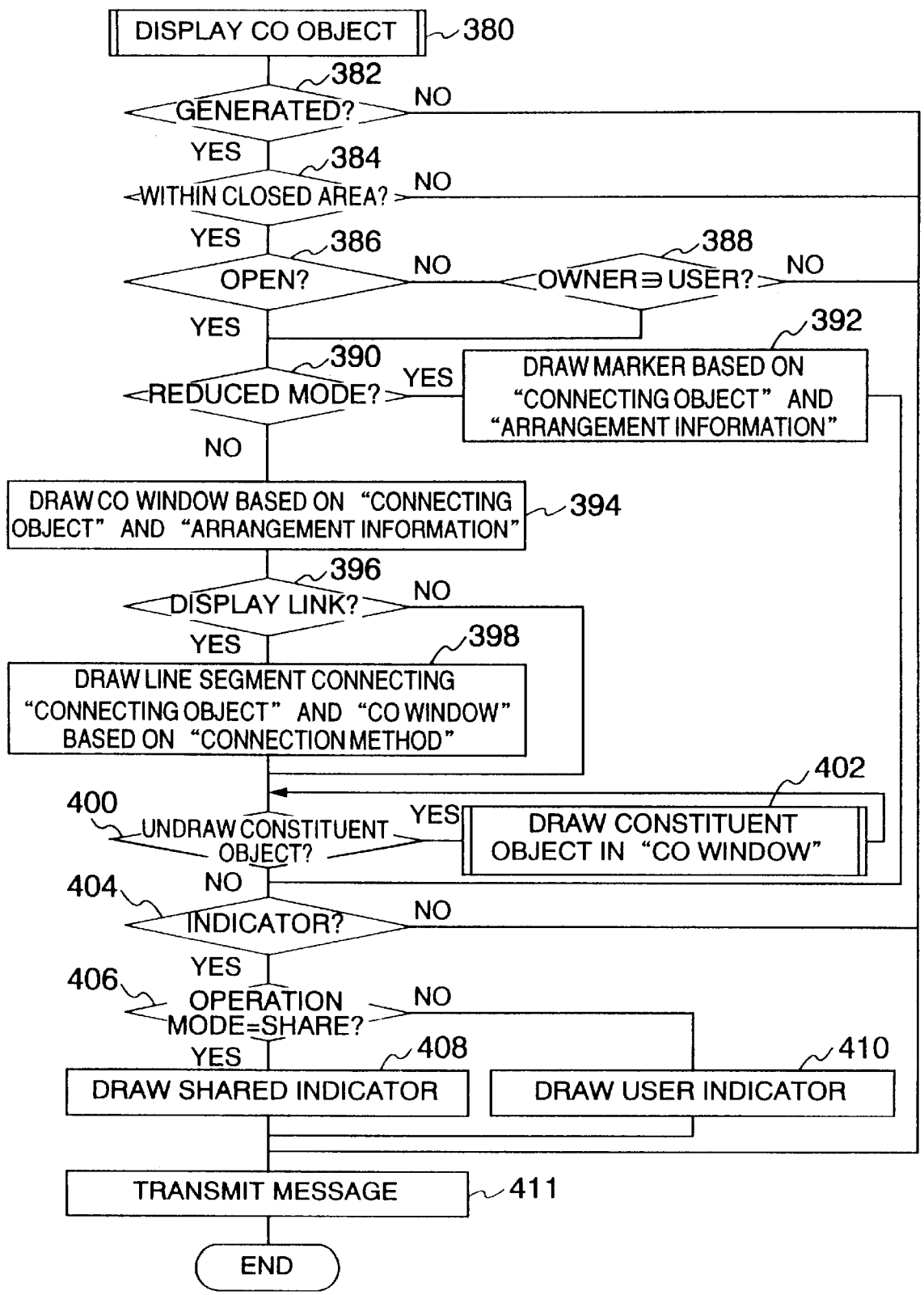
FIG. 15 shows a flow chart of a process of CO object display in the embodiment.

FIG. 15 shows a flow of a process when the CO object is to be displayed. When the display of the CO object is indicated to the computer 100 by the user or in a particular process of the computer 100, the CO object display process 380 is started. First, whether the table entry for the CO is secured or not (step 382), whether the participant who desires to display the CO is included in the group set as the closed area or not (step 384), whether the CO is open or not (step 386) and whether the participant is the owner of the CO or not (step 388) are sequentially confirmed from the settings of the attribute values of the object management data 142. If any one of the above is not met, the process is terminated.

Then, if the "reduction" has been set in the reduced display mode 186 of the object management data 142 (step 390), the marker is drawn at the position indicated by the arrangement data 196 to the DO indicated by the connecting object 190 (see 200-C of FIG. 4). If the reduced display has not been designated, a comment window is drawn at the position indicated by the arrangement data 196 to the DO (step 394). If the "display" has not been set in the link display 192 (step 396), a segment connecting the DO and the comment window is drawn in accordance with the setting of the connection method 194 (step 398). All of the information indicated by the constituent object 190 of the DO are displayed in the comment window (steps 400 and 402). When the "display" has been set in the indicator 172 (step 404), the indicator indicating the share (step 408) or the indicator indicating the user as the owner (step 410) is drawn at the particular position of the CO in accordance with the setting of the operation mode (step 406). Finally, the operation message 700 (FIG. 9) to display the object is transmitted to other computers 100 (step 411).

Figure 16:
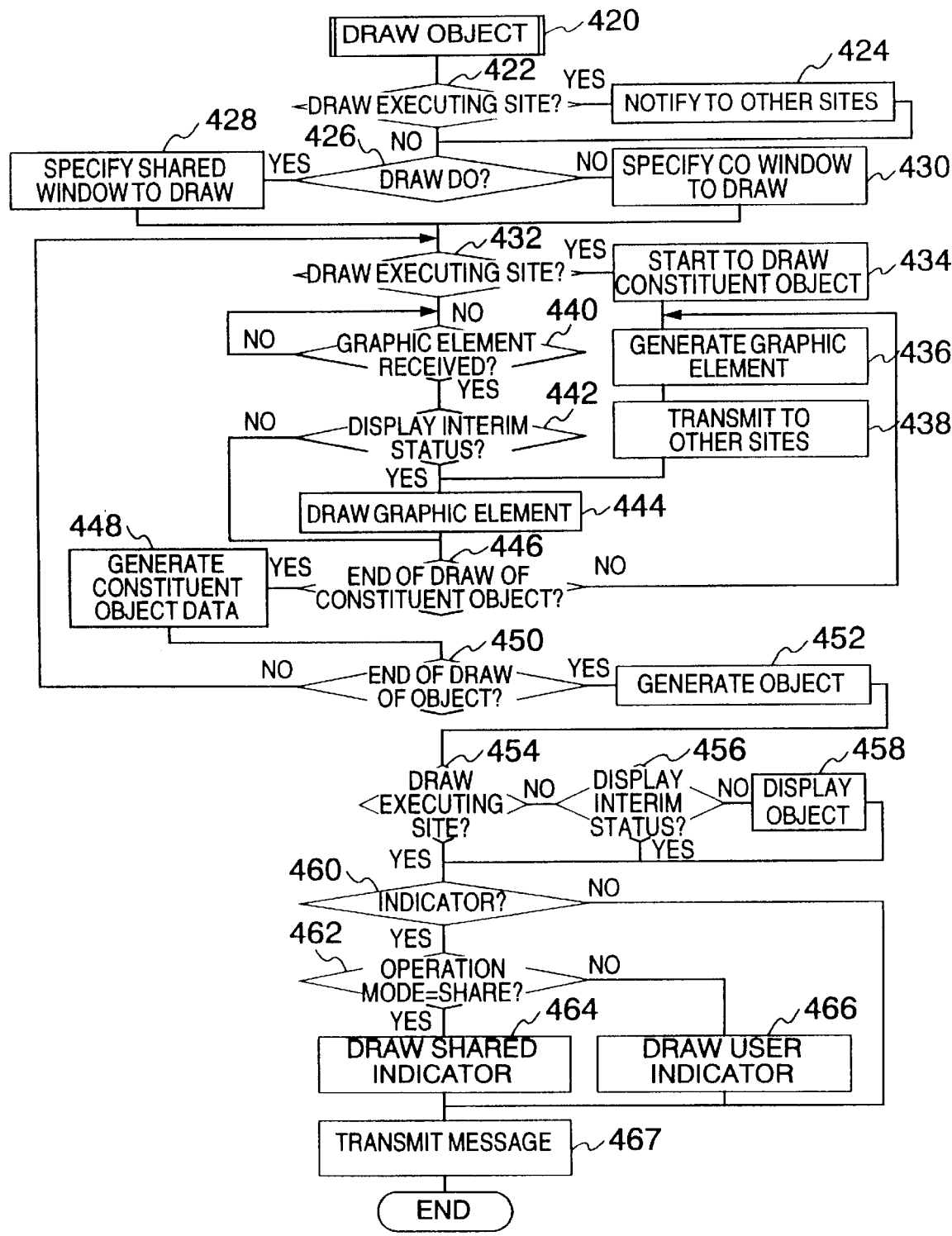
FIG. 16 shows a flow chart of a process of object draw in the embodiment.

FIG. 16 shows a flow of a process when the DO and the CO objects are to be displayed. The process shown in FIG. 16 corresponds to the process 326 of FIG. 13 and the process 350 of FIG. 14.

In FIG. 16, first, when the object to be drawn is prepared in its own computer 100 (site) (YES in step 422), the start of the drawing of the object (the message 784 in FIG. 9) is informed from the site to other sites (step 424). By the decision of the step 422, the further notice of the start of drawing received by other site is prevented.

The object management data of the object is examined and if the object is the DO (step 426), the shared window on which the object is to be drawn is specified and stored (step 428). If the object is CO, the comment window is specified (step 430). If the site is one in which the drawing is to be conducted (step 432), the drawing of the object constructed by the graphic elements is started (step 434). Each time the graphic element of the object for which the drawing is to be started is entered by the participant (step 436), the graphic element is transmitted to other participants by the message 786 (FIG. 9) (step 438) and it is also drawn at its own site (step 444). The graphic element means, for example, a line segment sequentially generated when the user draws a free curve.

In other sites, the user as the participant does not execute the drawing but the graphic element transmitted in this manner is automatically drawn. Namely, at the site which does not execute the drawing (step 432), the transmission of the graphic element from the site which executes the drawing is monitored (step 440), and if it is instructed to display the interim status (step 442), the received graphic element is drawn (step 444).

As the graphic elements are sequentially generated and the drawing of the present constituent object is completed (step 446), the received data constituting the constituent object is added to the list indicated by the constituent objects 184 and 189 (step 448). If the constituent object is not yet completed (NO in step 446), the user prompts the generation of the next graphic element (step 436). When the constituent objects have been generated and the drawing of the object is completed (step 450), the object management data 142 for managing the object is finalized (step 452). When the user designates the addition of the constituent object (step 450), the drawing of the next constituent object is started (step 434).

If the site is not one which executes -the drawing (step 454), the interim status of the drawing of the constituent object may not be displayed (the step 444 may not be executed) (NO in step 456). In this case, the entire object is displayed at that time (step 458). Finally, when the "display" has been set in the indicator 172 (step 460), the indicator indicating the share (step 464) or the indicator indicating the user as the owner (step 466) is drawn in accordance with the setting of the operation mode 168 (step 462). Finally, the operation message 788 (FIG. 9) to terminate the drawing of the object is transmitted to other computers 100 (step 467).

Figure 17:
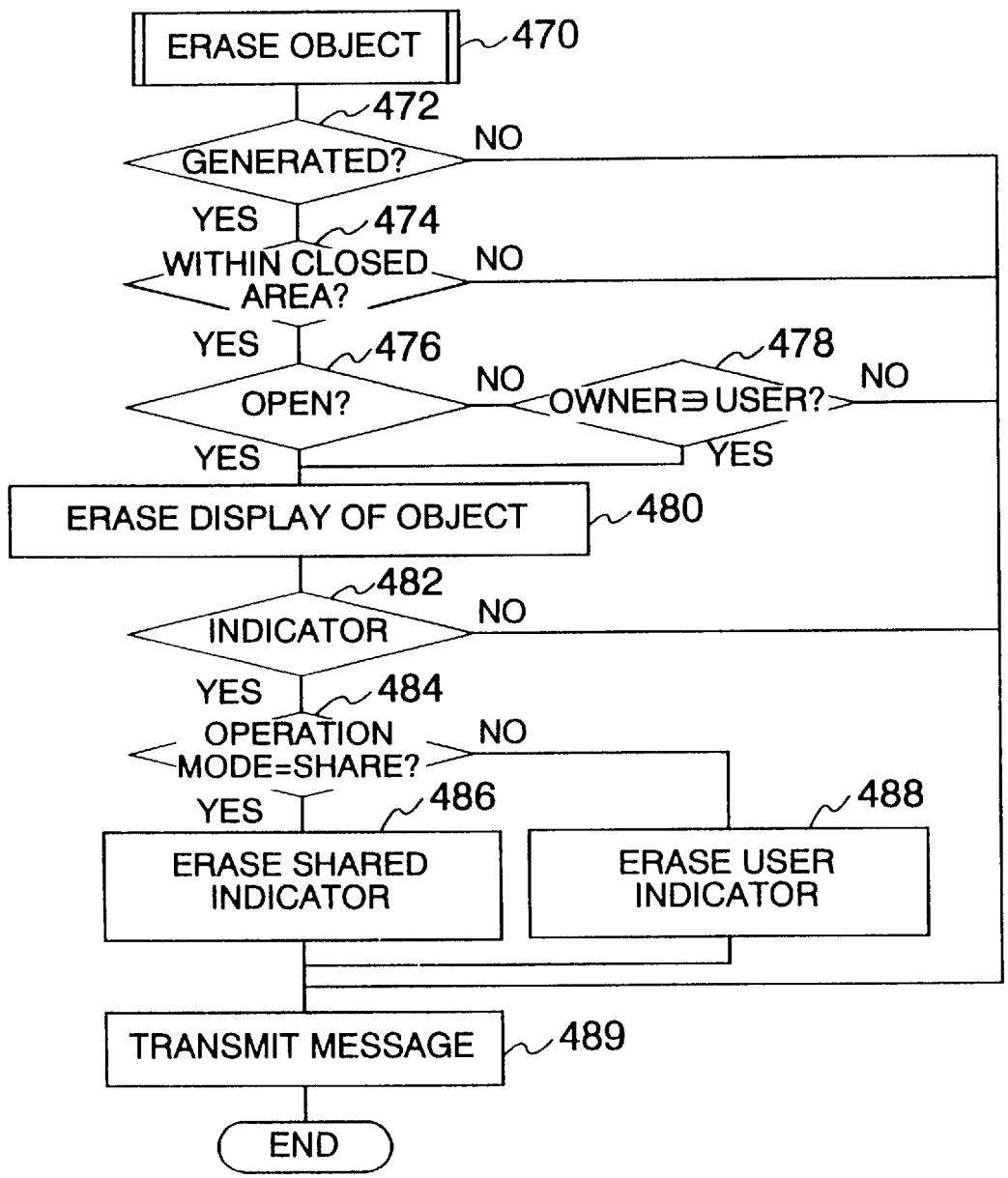
FIG. 17 shows a flow chart of a process of object erasing in the embodiment.

FIG. 17 shows a flow of a process 470 when the display of the object is to be erased. When the erasure of the display of the object is indicated to the computer 100 by the user or in a particular process of the computer 100, the precess of erasure of the object is started. First, whether the table entry for the object is secured or not (step 472), whether the participant who desires to erase the object is included in the group set by the closed area or not (step 474), whether the object is open or not (step 476) and whether the participant is the owner of the object or not (step 478) are sequentially confirmed from the settings of the attribute values of the object management data 142. If the above is met, it turns out that the object is presently displayed. In this case, the display of the object is erased while taking the constituent object into consideration (step 480). If the "display" has been set in the indicator 172 (step 482), the indicator indicating the share (step 486) or the indicator indicating the user as the owner (step 488) are erased in accordance with the setting of the operation mode 168. Finally, the operation message 792 (FIG. 9) to erase the object is transmitted to other computers 100 (step 489).

Figure 18:
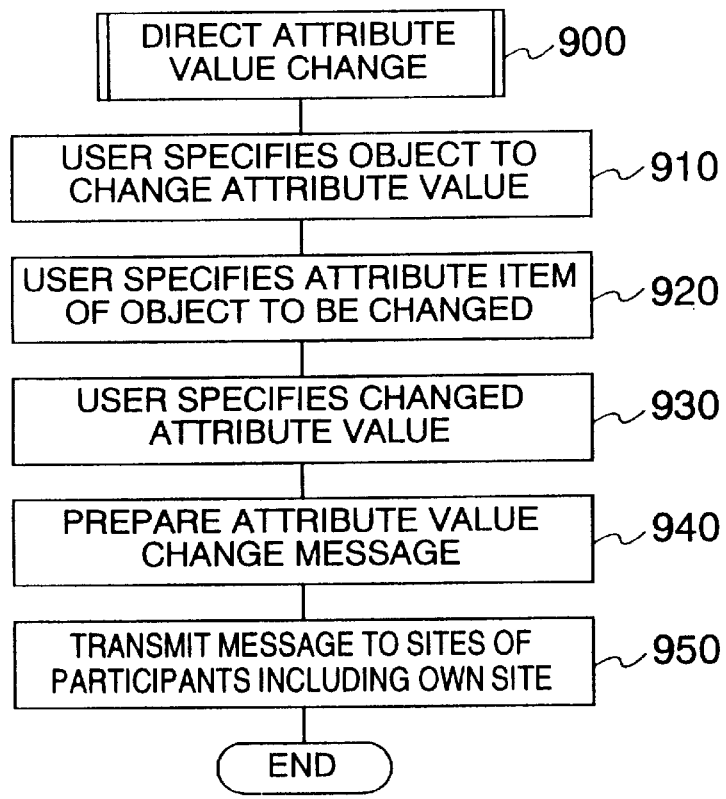
FIG. 18 shows a flow chart of a process of object attribute modification command in the embodiment.

FIG. 18 shows a process 900 when the attributes of the displayed object are to be changed by the participant. First, the user (participant) designates the object whose attribute is to be changed (step 910). The designation may be conducted by the user by operating the mouse to move a mouse cursor on the object under consideration and double-clicking the mouse. Then, the attribute item to be changed of the selected object is designated (step 920). The designation is conducted in the menu or dialog box in which a list of the attributes is displayed. The user enters a new setting of the attribute (step 930). This entry may be executed by using the above menu. The object operation message 794 (see FIG. 9) is prepared in accordance with the user selection and the entry (step 940). The message data thus prepared is transmitted to the computers 100 of all participants including the author participant (step 950).

Figure 19:
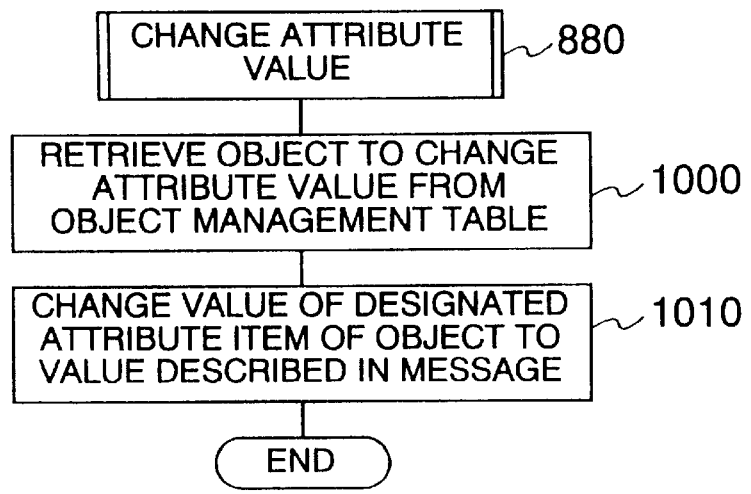
FIG. 19 shows a flow chart of a process of object attribute modification in the embodiment.

FIG. 19 shows a process 880 conducted by the computer which received the object attribute change message 794 in accordance with the content of the message. First, the object management data indicated by the object ID 710 of the received operation message data 794 is retrieved from the object management data stored in the work area of the internal memory (step 1000). The attribute setting of the retrieved management data is changed to the value of the changed attribute value 780 included in the operation message data 794 (step 1010). In the present embodiment, the change of the object attribute value is not immediately reflected by the display of the object. In order to reflect the new attribute value by the display, that is, in order to redisplay the object in accordance with the new attribute value, the erasure process 470 (FIG. 17) and the display process (FIG. 13, 14 or 15) may be conducted for the new object.

Figure 20:
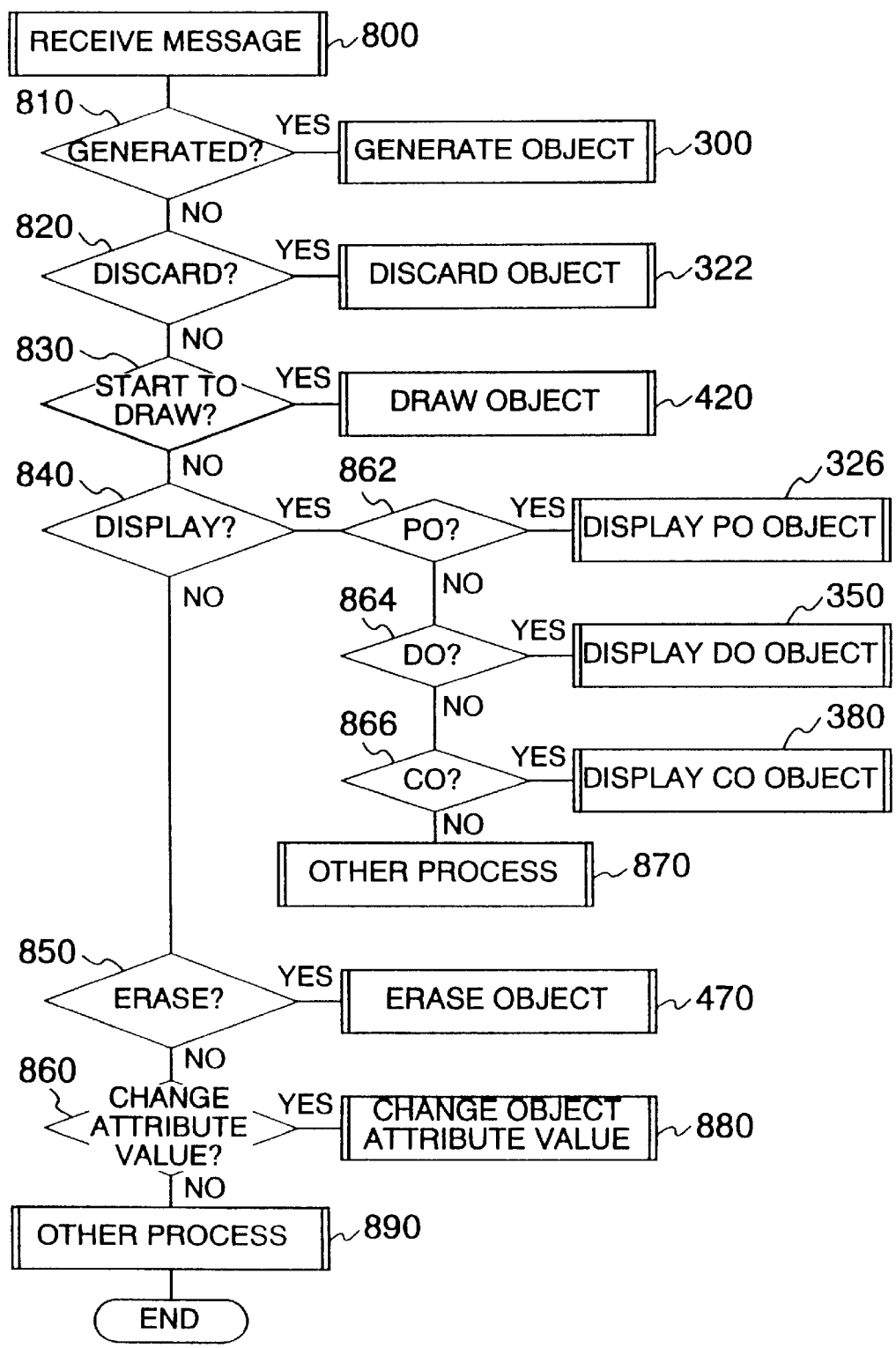
FIG. 20 shows a flow chart of a process of message reception in the embodiment.

FIG. 20 shows a flow of a reception process 800 when the object operation message (FIG. 9) is received. First, the settings of the received object operation message are examined. If the message ID 710 indicates the object generation (step 810), the object generation process 300 (FIG. 11) is conducted. If the message ID 710 indicates the discard of the object (step 820), the discard process 322 (FIG. 12) of the object is conducted, and if the start of the drawing of the object is indicated (step 820), the object draw process 420 (FIG. 16) is conducted. If the message ID 710 indicates the display of the object (step 840), the displaying of the object is conducted (326 (FIG. 13), 350 (FIG. 14) or 380 (FIG. 15)) in accordance with the type of the object ID 720 (step 862, 864 or 866). If the message ID 710 indicates the erasure of the object (step 860), the object erasure process 470 (FIG. 17) is conducted, and if the change of the attribute of the object is indicated (step 860), the object attribute change process 880 (FIG. 19) is conducted.

In the processes 300, 322, 420, 326, 350, 380 and 470 conducted in the reception process, the transmission of the operation message is not conducted.

In the present embodiment, each of the participants can use a plurality of shared windows. This is explained below.

Figure 21A:
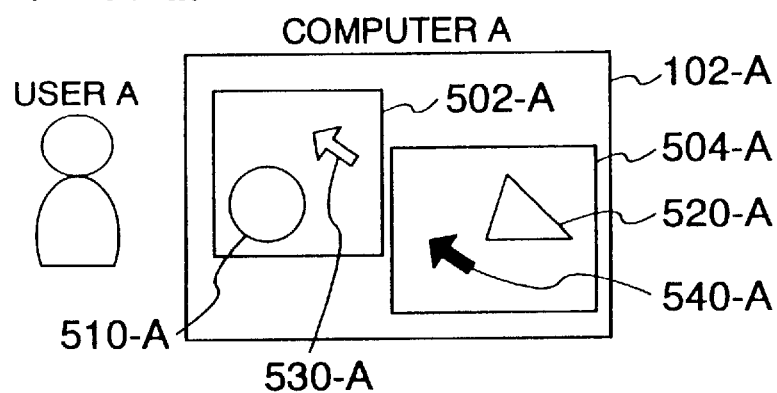
FIG. 21 illustrates the utilization of a plurality of shared windows in the embodiment.
Figure 21B:
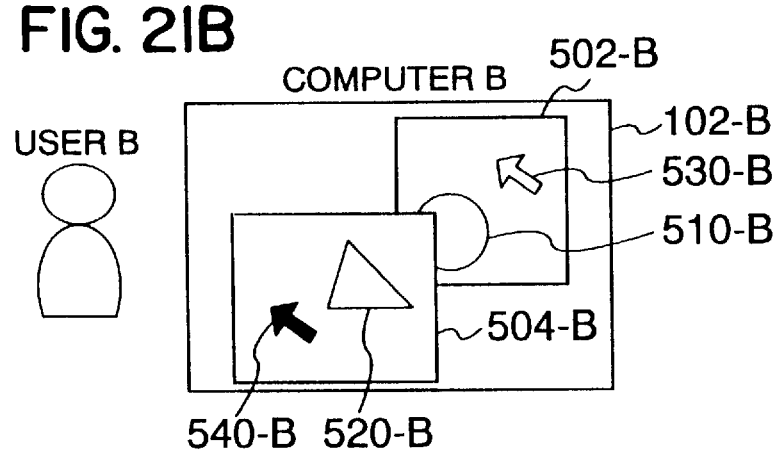
Figure 21C:
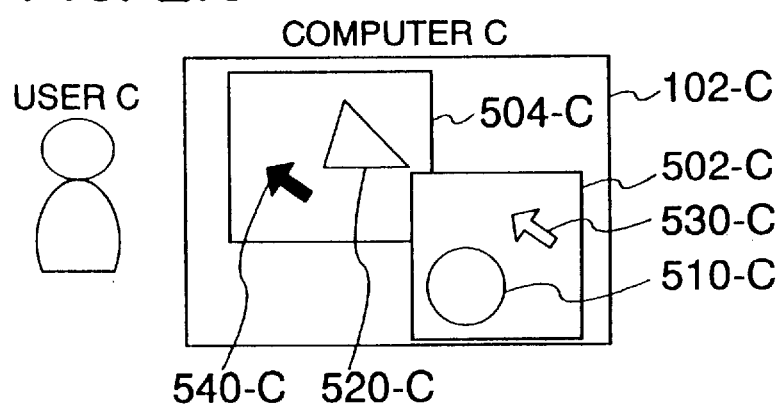

FIG. 21 shows a manner in which a plurality of shared windows and a plurality of objects are used by each participant. In FIG. 21, two windows 502 and 504b are displayed on each display of three participants A, B and C and two objects 501 and 530 or 520 and 540 are displayed in each shared window.

FIG. 22 shows memory content of the work area 20 of the internal memory of each computer 100. As shown in FIG. 22, four object management data 600, 610, 620 and 630 generated for displaying the objects 510, 530, 520 and 540 are stored in each work area. Each object is displayed on the corresponding window in accordance with 25 the settings set in the window ID 147 of the object management data. For example, for the management data 600-A, the object data ID 510 indicates that the object is the DO and the window ID 147 indicates that the object is displayed on the shared window 502-A. The DO object 510-A is displayed on the display of the user A in accordance with the setting of those attributes. It should be noted that the object IDs of the corresponding objects are identical in the displays of the displays 102-A–102-C.

Since the object management is conducted in each of the computers of the participants A–C, the attribute settings may be changed for each computer for the corresponding object.

In the present embodiment, each participant can utilize more shared windows and more objects. Further, several private windows may be displayed in addition to the shared windows and they may be used simultaneously with the shared windows.

While the POs 530 and 540 and the DOs 510 and 520 are displayed in the present embodiment, it is apparent that the COs may be equally used.

We claim:

1. A collaborative work support system including a plurality of computers each having a display device connected through a communication network, comprising:
   means for displaying a shared window on each display device of each of said computers;
   means for accepting an entry of an object from a user of one of said computers and accepting an attribute for designating a user or a group of users as a display attribute of the object, said display attribute restricting the display of said object to the designated user or group of users; and
   display control means for displaying said object on the shared window displayed on the display device of said one computer and displaying said object on the shared window on each of the display devices of the computers used by the user or group of users designated by the display attribute.

2. A collaborative work support system according to claim 1 further comprising:
   means for accepting change of the attribute of the object displayed on the shared window displayed on the display device of said one computer.

3. A collaborative work support system according to claim 1, wherein said object includes one of a pointing object having a display position thereof on the shared window moved in accordance with the operation by the user, a draw object which is an image displayed on the shared window and a comment object which is an image including a text and displayed in association with said draw object selectively in accordance with the operation by the user.

4. A collaborative work support system including a plurality of computers each having a display device connected through a communication network, comprising:
   means for displaying a shared window on each display device of each of said computers;
   means for accepting an entry of an object from a user of one of said computers and accepting an attribute for designating a user or a group of users as an operation attribute of the object, said operation attribute restricting an effective range of an operation to said object within the designated user or the users belonging to the designated group;
   means for displaying the object on each shared window displayed on said display device of each of said computers; and
   operation means for accepting an operation entry of the object displayed on the shared window displayed on the display device of an arbitrary computer by the user of said arbitrary computer and applying the accepted operation to the object;
   said operation means accepting the operation of the object only when the user entering the operation is the user or one of the users belonging to the group of users designated by the operation attribute.

5. A collaborative work support system according to claim 4 further comprising:
   means for accepting change of the attribute of the object displayed on the shared window displayed on the display device of said one computer.

6. A collaborative work support system according to claim 4, wherein said object includes one of a pointing object having a display position thereof on the shared window moved in accordance with the operation by the user, a draw object which is an image displayed on the shared window and a comment object which is an image including a text and displayed in association with said draw object selectively in accordance with the operation by the user.

7. A collaborative work support system including a plurality of computers each having a display device connected through a communication network, comprising:
   means for displaying a shared window on each display device of each of said computers;
   means for accepting an entry of object from a user of one of said computers and accepting first information for designating a user or a group of users as a display attribute of the accepted object entry and also accepting second information for designating a user or a group of users as an operation attribute of the accepted object entry;
   display control means for displaying an object accepted in said one computer on the shared window displayed on the display device of said one computer and displaying said object on the display devices of the computers used by the user or the users belonging to the group of users designated by the display attribute of the object; and
   operation means for accepting an operation entry of the object displayed on the shared window displayed on the display device of said one computer by the user of said one computer and applying the accepted operation to the object;
   said operation means accepting the operation of the object only when the user entering the operation is the user or the users belonging to the group of users designated by the operation attribute of the object.

8. A collaborative work support system according to claim 7 wherein the group of users designated by the attribute includes all users of said plurality of computers.

9. A collaborative work support system according to claim 8 wherein the group of users designated by the attribute includes only a portion of the users of said plurality of computers.

10. A collaborative work support system according to claim 7 wherein the group of users designated by the attribute includes only a portion of the users of said plurality of computers.

11. A collaborative work support system according to claim 3 further comprising:

edit means for editing the object in said one computer in accordance with the operation by the user of said one computer and accepting a designation as to whether the object being edited is opened to other users or not from the user of said one computer;

when said edit means accepts the designation not to open the object being edited to other users, said display control means inhibiting the display of the object being edited on the display devices of the computers used by the user or the user belonging to the user group designated by the display attribute of the object.

12. A collaborative work support system according to claim 7 further comprising:

means for displaying an identifier identifying the user or the group of users designated by the operation attribute of the object at a specified position of the object in the shared window displayed on the display device of each of said computers.

13. A collaborative work support system according to claim 7, further comprising:

means for accepting change of the attribute of the object displayed on the shared window displayed on the display device of said one computer.

14. A collaborative work support system according to claim 7 wherein said object includes an pointing object having a display position thereof on the shared window moved in accordance with the operation by the user, a draw object which is an image displayed on the shared window and a comment object which is an image including a text and displayed in association with said draw object selectively in accordance with the operation by the user.

15. A collaborative work support system for displaying shared windows on display devices of a plurality of computers connected through a communication network, each of said computers comprising:

means for storing object management data for determining a plurality of attributes for each of objects to be displayed on said shared windows; and means for displaying the object on the shared windows displayed on the associated display devices in accordance with the object management data;

at least one attribute of the object in said object management data including an attribute value to limit an effective range of the attribute to a group of computers within said plurality of computers.

16. A collaborative work support system according to claim 15 further comprising:

means for accepting a direction to change an attribute value of a selected attribute in the object in the object management data and changing the attribute value in accordance with the direction.

17. A collaborative work support system according to claim 15 wherein one of the attributes of the object includes an attribute value to limit the effective range of all attributes of the object to a portion of said plurality of computers.

18. A collaborative work support system according to claim 15 wherein one of the attributes of the object includes an attribute value to set whether an interim status of the preparation of the object to be displayed on the shared windows displayed on the display devices of the computers other than the computer of the site at which the object is being prepared.

19. A collaborative work system according to claim 15 wherein one of the attributes of the object includes an attribute value to set whether an attribute value of the attribute of the owner of the object is to be displayed additionally to the object displayed on the shared window.

20. A collaborative work support system according to claim 15 wherein said object includes at least one of a tele-pointing object, a tele-writing object and a comment object.

21. A collaborative work support system according to claim 15 wherein at least one of the attributes includes an attribute value applied to all of said plurality of computers and one of the attribute values is selected as the attribute value of said at least one attribute.

22. A collaborative work support system according to claim 15 wherein the effective range of said at least one attribute designates all computers for which the display of the corresponding objects on the shared windows is granted.

23. A collaborative work support system according to claim 15 wherein the effective range of said at least one attribute designates all computers for which the operation of the corresponding objects on the shared windows are granted.

* * * * *